United States Patent
Wu et al.

(10) Patent No.: US 10,567,786 B2
(45) Date of Patent: Feb. 18, 2020

(54) MOTION VECTOR PROCESSING

(75) Inventors: Zhuangfei Wu, Danderyd (SE); Thomas Rusert, Kista (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 1312 days.

(21) Appl. No.: 14/238,501

(22) PCT Filed: May 28, 2012

(86) PCT No.: PCT/SE2012/050568
§ 371 (c)(1),
(2), (4) Date: Feb. 12, 2014

(87) PCT Pub. No.: WO2013/028116
PCT Pub. Date: Feb. 28, 2013

(65) Prior Publication Data
US 2014/0185686 A1  Jul. 3, 2014

Related U.S. Application Data

(60) Provisional application No. 61/525,276, filed on Aug. 19, 2011.

(51) Int. Cl.
*H04N 19/513* (2014.01)
*H04N 19/105* (2014.01)
(Continued)

(52) U.S. Cl.
CPC ......... *H04N 19/513* (2014.11); *H04N 19/103* (2014.11); *H04N 19/105* (2014.11);
(Continued)

(58) Field of Classification Search
CPC ...... H04N 19/139; H04N 19/61; H04N 19/50; H04N 19/513; H04N 19/103; H04N 19/105; H04N 19/109; H04N 19/51; H04N 19/52; H04N 19/56; H04N 19/573; H04N 19/577; H04N 19/597
USPC ..................................... 375/240.16
See application file for complete search history.

(56) References Cited

U.S. PATENT DOCUMENTS

| | | | |
|---|---|---|---|
| 2012/0075535 A1* | 3/2012 | Van Beek | H04N 5/145 348/699 |
| 2012/0269269 A1* | 10/2012 | Choi | H04N 19/597 375/240.16 |
| 2014/0078254 A1* | 3/2014 | Lin | H04N 19/597 348/43 |

FOREIGN PATENT DOCUMENTS

JP  2009510892 A  3/2009

OTHER PUBLICATIONS

Gou, Xun, et al. "Inter-View Direct Mode for Multiview Video Coding." IEEE Transactions on Circuits and Systems for Video Technology. vol. 16, No. 12. Dec. 2006. 1527-1532.
(Continued)

*Primary Examiner* — William C Vaughn, Jr.
*Assistant Examiner* — Jae N Noh
(74) *Attorney, Agent, or Firm* — Sage Patent Group

(57) ABSTRACT

The embodiments relates to motion vector prediction and decoding for multi-view video content from multiple camera views (10, 20). At least one candidate motion vector predictor (44, 54) is provided for a current motion vector (34) to be encoded. A motion vector predictor (44) is then determined from the at least one candidate motion vector predictor (44, 54). Correspondingly, during decoding a motion vector (34) is determined for a current pixel block (30) based on a motion vector predictor (44) determined for the current pixel block (30).

37 Claims, 14 Drawing Sheets

(51) Int. Cl.
| | |
|---|---|
| H04N 19/597 | (2014.01) |
| H04N 19/56 | (2014.01) |
| H04N 19/52 | (2014.01) |
| H04N 19/51 | (2014.01) |
| H04N 19/103 | (2014.01) |
| H04N 19/109 | (2014.01) |
| H04N 19/573 | (2014.01) |
| H04N 19/577 | (2014.01) |

(52) U.S. Cl.
CPC .......... *H04N 19/109* (2014.11); *H04N 19/51* (2014.11); *H04N 19/52* (2014.11); *H04N 19/56* (2014.11); *H04N 19/573* (2014.11); *H04N 19/577* (2014.11); *H04N 19/597* (2014.11)

(56) References Cited

OTHER PUBLICATIONS

Jung, Joel. "Competition-Based Scheme for Motion Vector Selection and Coding." ITU—Telecommunications Standardization Sector. Video Coding Experts Group (VCEG). VCEG-AC06. 29th Meeting. Klagenfurt, Austria. Jul. 17-18, 2006. 1-7.

Koo, Han-Suh, et al. "MVC Motion Skip Mode." Joint Video Team (JVT) of ISO/IEC MPEG & ITU-T VCEG. JVT-W081. 23rd Meeting. San Jose, California. Apr. 21-27, 2007. 1-13.

Laroche, Guillaume, et al. "RD Optimized Coding for Motion Vector Predictor Selection." IEEE Transactions on Circuits and Systems for Video Technology. vol. 18, No. 12. Dec. 2008. 1681-1691.

Li, Dong, et al. "Enhanced Block Prediction in Stereoscopic Video Coding." IEEE 2011. 1-4.

Ryu, Seungchul, et al. "Adaptive Competition for Motion Vector Prediction in Multi-view Video Coding." IEEE 2011. 1-4.

Tourapis, Alexis Michael, et al. "Direct Mode Coding for Bipredictive Slices in the H.264 Standard." IEEE Transactions on Circuits and Systems for Video Technology. vol. 15, No. 1. Jan. 2005. 119-126.

Unknown, Author, "Information Technology—Coding of Audio-Visual Objects—Part 10: Advanced Video Coding." International Standard. ISO/IEC 14496-10. 2010. 1-704.

Park, Seungwood et al., "A study on simplification of spatial/temporal MVP scaling (CE9 SP01+SP06S2+SP07)", Joint Collaborative Team on Video Coding (JCT-VC) of ITU-T SG16 WP3 and ISO/IEC JTC1/SC29/WG11, Document JCTVC-F089, 6th Meeting: Torino, IT, Jul. 14-22, 2001, 1-9.

* cited by examiner

MOTION VECTOR PROCESSING

TECHNICAL FIELD

The present embodiments generally relate to processing of motion vectors, and in particular to prediction and decoding of such motion vectors.

BACKGROUND

H.264, also denoted Moving Picture Experts Group-4 (MPEG-4) Advanced Video Coding (AVC), is the state of the art video coding standard. It is a hybrid codec which takes advantages of eliminating redundancy between frames and within one frame and uses a number of compression techniques that give good compression efficiency. The output of the encoding process is video coding layer (VCL) data which is further encapsulated into network abstraction layer (NAL) units prior to transmission or storage.

H.264 is block-based, i.e. a video frame is processed in macroblock (MB) units, which are 16×16 pixel blocks that may be further divided into sub-macroblocks (sMB). In order to minimize the amount of data to be coded, a technology called motion compensation (MC) is done on each non-intra pixel block which uses previously reconstructed pixel values in neighboring frames to predict the pixel values of the current pixel block at its best effort. To get a prediction for the current pixel block, an area that is similar to current pixel block in the reference frame is signaled in the bitstream. Final reconstruction can be made by adding the predicting pixel values together with the residue pixel values. In order to find a best match of current pixel block in a reference frame, motion search is usually done at the encoder side. It tries to find lowest sum of squared differences (SSD) or sum of absolute differences (SAD) between the current pixel block and possible reference pixel blocks. The outcome of the motion search is a reference index signaling which reference frame it refers to and an offset vector called motion vector (MV) pointing to the reference area. MV is an important and consuming component in the video bitstream. For video coded with high Quantization Parameter (QP), it can take up to over 50% of the bitrate.

Motion Vector Coding

MVs are not directly coded into bitstream since there are redundancies to exploit between MVs. Neighboring MVs often have high correlations and MVs with similar length and direction are often clustering together. These clustered MVs could correspond to local motion where an object is moving or global motion where there is a panning. For each MV to be coded, a MV prediction is done first to reduce the amount of data so that only the difference between the MV and the MV predictor is coded. In H.264, a median predictor is generated by taking the median value of the MVs from the pixel block to the left, above and top-right. The process is done for the horizontal and vertical MV component respectively.

Multi-View Video Coding (MVC)

While "traditional" video services provide video in a single representation, i.e. fixed camera position, multi-view video representations has recently gained significant importance. A multi-view representation represents the content from different camera perspectives or views, a particular case being the "stereoscopic video" case, where the scene is captured from two cameras that have the same or a similar distance as the human eye. Using suitable display technologies to present the "stereoscopic" content to the viewer, perception of depth can be provided to the viewer.

MVC is a video coding standard that can be used to compress multi-view video representations. High compression efficiency is achieved by eliminating redundant information between different layers. MVC is based on the AVC standard and consequently MVC shares most of the AVC structure.

MVC Reference Picture List

The major difference between MVC and AVC is the reference picture list handling process. A reference picture list is a collection of pictures that can be used for prediction. They are normally sorted in an order based on how close they are to the current frame. In AVC, all the reference pictures in the list are from the same view. In MVC, apart from reference pictures from the same view, there are also reference pictures from other views. Hence the first step of MVC reference picture list construction process is exactly the same as in AVC, and the difference lies in that inter-view reference pictures are appended afterwards. Due to complexity consideration, it is only allowed to add frames at the same instance in time from other views to the list in MVC.

High Efficiency Video Coding (HEVC)

HEVC is a next generation video coding standard that is currently under standardization process. HEVC aims to substantially improve coding compared to AVC, especially for high resolution video sequences. The initial focus of the HEVC development is on mono video, i.e. a single view.

Motion Vector Competition

Median MV predictor in H.264 is not so efficient in many cases. VCEG Contribution [1] described a new technology denoted as motion vector competition. The key concept of this technology is to take the MV from the neighboring pixel blocks which are often highly correlated to the current MV to form a list of candidate MVs, where neighboring pixel blocks can be either spatial neighbors, i.e. same frame, or temporal neighbors, i.e. different frames These candidate MVs are scaled according to their temporal distance to their respective reference frames. Only one candidate MV from the list is selected to be the predictor based on rate-distortion (RD) criteria, and the corresponding index entry to the list is transmitted in the bitstream. Motion vector competition in general improves video coding performance as compared to median MV prediction and is therefore suggested for usage in HEVC.

In motion vector competition, the selected candidate MVs generally need to be scaled before being put into the candidate list since it does not necessarily have the same reference distance as the reference distance of the current pixel block for which the MV prediction is made. The term "reference distance" refers to the difference of picture order count (POC) between the frame with the MV and the frame that the MV points to. In FIG. 1, there are seven frames marked by POC 0-6 which is the display order of a video sequence. In the example, frames with POC equal to 0, 1, 3, 4, 5, 6 are already coded frames. Frame with POC=2 is the current frame that is to be coded, and the pixel block in the middle of frame 2 is the current pixel block where the pixel blocks above it are already coded. The current pixel block is testing inter prediction mode which uses reference areas from frame 0 as reference. Three candidate MV predictors are shown in the figure, they are MV B from a spatial neighboring pixel block in the current frame, and MV A and C from temporal collocated blocks before and after the current frame respectively. A scaling factor is used on these candidate MV predictors before they are adopted into the candidate list. The scaling factor formula is:

$$\text{scaling} = \frac{CurrDistance}{RfDistance} = \frac{CurrPOC - CurrRfPOC}{RfPOC - RfRfPOC}$$

In FIG. 1, CurrDistance=2−0=2. RfDistance equals to 1−0=1, 2−0=2 and 3−6=−3 for MV A, B and C respectively. Therefore the scaling factors for MV A, B and C are 2/1=2, 2/2=1 and −2/3 respectively. Each candidate MV predictor is scaled up or down according to the calculated scaling factor. These scaled MV predictors are shown at the bottom of FIG. 1.

The motion vector competition described above and proposed for HEVC work well for mono video. However, when applying motion vector competition to multi-view sequences in HEVC or indeed MVC problems can occur.

For instance, when applying motion vector competition to a multi-view video sequence, a motion vector can point to a frame with the same POC but in another view or a candidate MV predictor could point to a frame with the same POC in another view. In these cases, the numerator and the denominator, respectively, of the above presented scaling formula is zero. This results in a zero scaling factor or an indefinite scaling factor, respectively.

Furthermore, suboptimal compression performance can occur when selecting candidate MV predictors when having the possibility of using not only spatially and temporally neighboring candidate MV predictors but also MVs from other views.

There is, thus, a need for an efficient handling of motion vectors that is adapted for usage in connection with multi-view video.

SUMMARY

It is an objective to provide an efficient handling of motion vectors for multi-view video.

An aspect of the embodiments defines a method of motion vector prediction for multi-view video coding of video content from multiple camera views. The method comprises determining a motion vector type from multiple predefined motion vector types for a motion vector. This motion vector is estimated for a current pixel block in a current frame of a current camera view. The motion vector identifies a reference pixel area in a reference frame. The motion vector type is determined based on at least one of i) the current camera view and a camera view of the reference frame, and ii) a point in time of the current frame and a point in time of the reference frame. At least one candidate motion vector predictor of the determined motion vector type is identified and a motion vector predictor is determined for the motion vector based on the at least one candidate motion vector predictor.

This aspect of the embodiments further defines a device for motion vector prediction for multi-view video coding of video content from multiple camera views. The device comprises a type determiner configured to determine a motion vector type from multiple predefined motion vector types for a motion vector estimated for a current pixel block in a current frame of a current camera view. The estimated motion vector identifies a reference pixel area in a reference frame. The type determiner is configured to determine the motion vector type based on at least one of i) the current camera view and a camera view of the reference frame, and ii) a point in time of the current frame and a point in time of the reference frame. The device also comprises a predictor identifier configured to identify at least one candidate motion vector predictor of the motion vector type determined by the type determiner. A predictor determiner of the device is configured to determine a motion vector predictor for the motion vector based on the at least one candidate motion vector predictor identified by the predictor identifier.

The present aspect of the embodiments also defines a computer program for predicting motion vectors for multi-view video coding of video content from multiple camera views. The computer program comprises code means which when run on a computer causes the computer to determine a motion vector type from multiple predefined motion vector types for a motion vector of a current pixel block in a current frame of a current camera view. The motion vector identifies a reference pixel area in a reference frame. The computer is caused to determine the motion vector type based on at least one of i) the current camera view and a camera view of the reference frame, and ii) a point in time of the current frame and a point in time of the reference frame. The computer is also caused to identify at least one candidate motion vector predictor of the determined motion vector type and determine a motion vector predictor for the motion vector based on the at least one candidate motion vector predictor.

A related aspect of the embodiments defines a method of motion vector decoding for encoded multi-view video from multiple camera views. The method comprises providing a reference frame index for a current pixel block in a current frame of a current camera view. This reference frame index identifies a reference frame. A motion vector type is determined from multiple predefined motion vector types for the current pixel block and based on at least one of i) the current camera view and a camera view of the reference frame, and ii) a point in time of the current frame and a point in time of the reference frame. A candidate list comprising at least one candidate motion vector predictor of the determined motion vector type is generated. The method further comprises determining a motion vector for the current pixel block based on a candidate motion vector predictor of the candidate list.

This related aspect of the embodiments further defines a device for motion vector decoding for encoded multi-view video from multiple camera views. The device comprises an index provider configured to provide a reference frame index for a current pixel block in a current frame of a current camera view. The reference frame index identifies a reference frame. A type determiner is configured to determine a motion vector type from multiple predefined motion vector types for the current pixel block and based on at least one of i) the current camera view and a reference camera view of the reference frame, and ii) a point in time of the current frame and a point in time of the reference frame. The device also comprises a list generator configured to generate a candidate list comprising at least one candidate motion vector predictor of the motion vector type determined by the type determiner. A vector determiner is configured to determine a motion vector for the current pixel block based on a candidate motion vector predictor of the candidate list.

The present related aspect of the embodiments also defines a computer program for decoding motion vectors for encoded multi-view video from multiple camera views. The computer program comprises code means which when run on a computer causes the computer to provide, for a current pixel block in a current frame of a current camera view, a reference frame index identifying a reference frame. The computer is caused to determine a motion vector type from multiple predefined motion vector types for the current pixel block and based on at least one of i) the current camera view and a camera view of the reference frame, and ii) a point in time of the current frame and a point in time of the reference frame. The computer is also caused to generate a candidate list comprising at least one candidate motion vector predictor of the determined motion vector type. The computer is further caused to determine a motion vector for the current pixel block based on a candidate motion vector predictor of the candidate list.

Categorizing and classifying motion vectors into different motion vector types and restricting candidate motion vector predictor selection based on motion vector types reduces the amount of candidate motion vector predictors that need to evaluated. This implies reduced complexity. At the same time coding efficiency can be improved since a reduced number of candidates results in smaller total amount of entries to be indexed so a shorter codeword can be assigned to represent the index and motion vector predictor selection.

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the drawings, the same reference numbers are used for similar or corresponding elements.

The present embodiments generally relate to the processing of motion vectors and in particular to motion vector prediction for multi-view video coding and motion vector decoding for encoded multi-view video. Thus, the embodiments enable an efficient and accurate motion vector prediction and decoding in applications where multiple camera views are present for recording scenes from different views.

The embodiments can advantageously be applied to the previously described HEVC standard using multi-view video coding and decoding. In addition, the embodiments can also be used in connection with other multi-view video coding and decoding standards and schemes utilizing motion vector prediction. For instance, the embodiments can be used in connection with MVC in order to enable motion vector prediction and decoding. The embodiments are advantageously used as a complement to motion vector competition in order to enable usage of motion vector competition also for multi-view video coding and decoding.

The embodiments as disclosed herein are, however, not limited to HEVC, MVC or indeed motion vector competition. In clear contrast, the embodiments can be used to predict and decode motion vectors in connection with any multi-view video application.

In traditional video coding with only one view, motion vectors are used in the context of pixel prediction from a reference frame at a reference point in time to a current frame at a current point in time. In the same sense, the term motion vector is sometimes used in video coding with multiple views to refer to prediction from a reference frame in a current view to a current frame in the current view, i.e. "pure temporal prediction". In the context of pixel prediction from a reference view at a current point in time to a current view at the current point in time ("pure inter-view prediction"), the term "disparity vector" is sometimes used. Herein, the term "motion vector" is used both in the context of "pure temporal prediction", "pure inter-view prediction", and combinations thereof, i.e. including in the context of pixel prediction from a reference view at a reference point in time to a current view at a current point in time.

Figure 1:
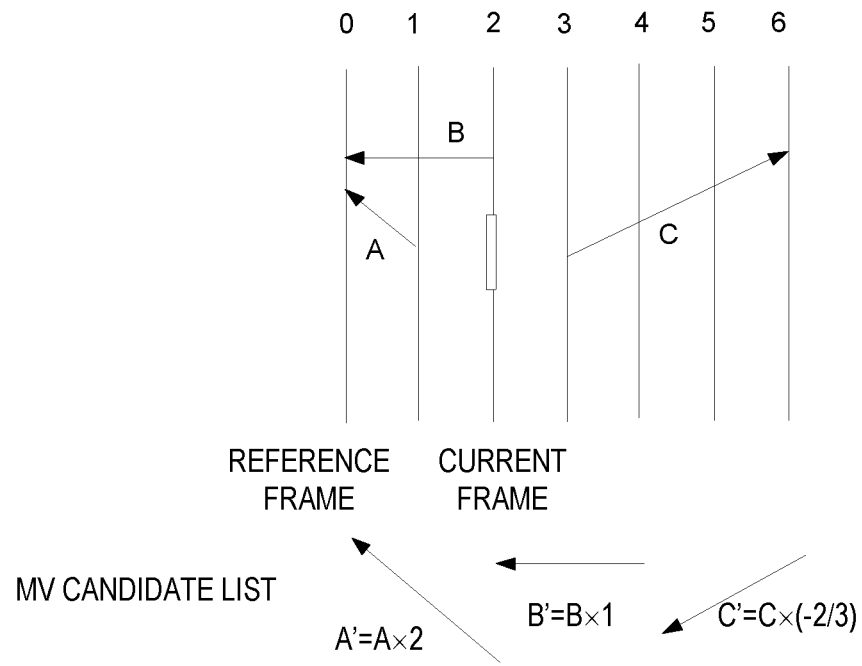
FIG. 1 schematically illustrates the concept of calculating scaling factors for motion vector candidates using motion vector competition.
Figure 2:
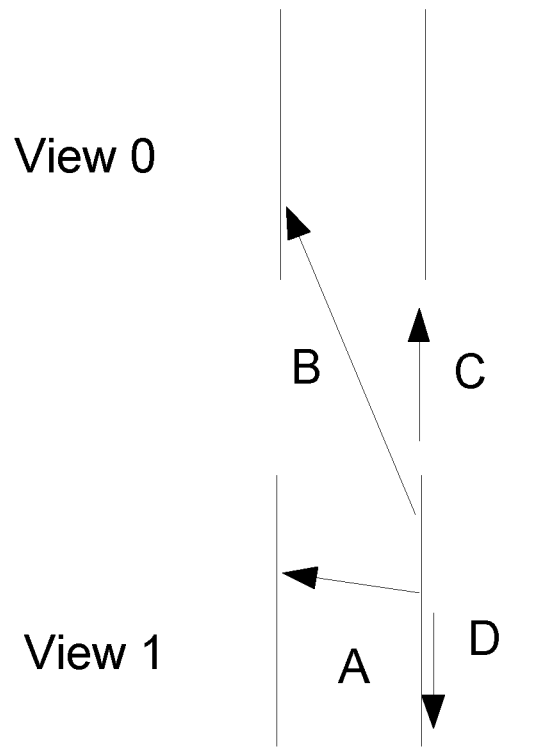
FIG. 2 schematically illustrates the concept of having different motion vector types.

When applying motion vector prediction in connection with multi-view video coding, such as doing the previously mentioned motion vector competition, various types of motion vectors are possible. This is schematically illustrated in FIG. 2. The motion vector A in FIG. 2 points from a current frame towards a reference frame backward in time (or forward in time) in a current view. This corresponds to a so-called temporal motion vector type and it generally represents a true motion of video content. Motion vector C points to a reference frame at the same point of time as the current frame but in another camera view. This is a so-called inter-view motion vector type and generally represents the disparity between the two views, i.e. view 0 and view 1. Motion vector B points to a reference frame at a different point of time as compared to the current frame but also in another camera view. This motion vector typically represents a combination of true motion and disparity and could be regarded as being of both the temporal and the inter-view motion vector type. A further optional variant is a so-called spatial motion vector type represented by the motion vector D, which points to coded pixel area in the current frame itself. Such a motion vector type can be considered to represent a repetitive pattern.

When providing candidate motion vector (MV) predictors for a current motion vector, such as a part of motion vector competition or other coding modes, such as the skip mode, non-optimal MV predictors can be selected if no limitation is imposed in the provision of the candidate MV predictors. For instance, a motion vector of inter-view MV type pointing to a frame with same point in time but in another camera view usually represents a pixel disparity since the two frames are captured at the same time where no motions are involved. In this case, it is typically not appropriate to use candidate MV predictors of the inter-view motion vector type when a current pixel block to be encoded has a motion vector pointing to pixel area in a previous or following reference frame of the same camera view as the current frame. The reason for this is that a motion vector of the inter-view MV type typically has no correlation with a motion vector of the temporal MV type. Hence, the result could then be suboptimal compression performance since the "optimal" MV predictor for the current motion vector is not selected.

Figure 4:
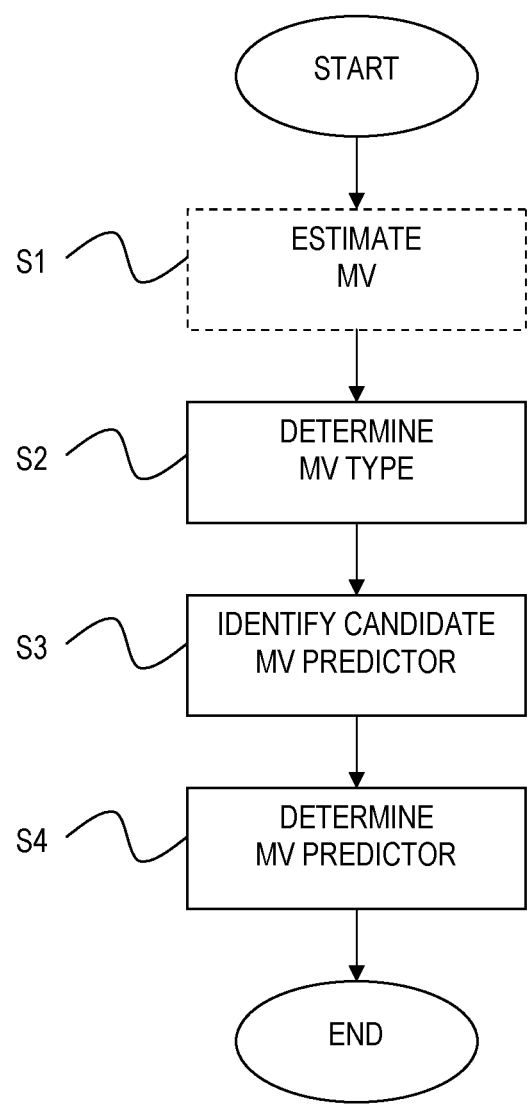
FIG. 4 is a flow diagram illustrating a method of motion vector prediction according to an embodiment.
Figure 10:
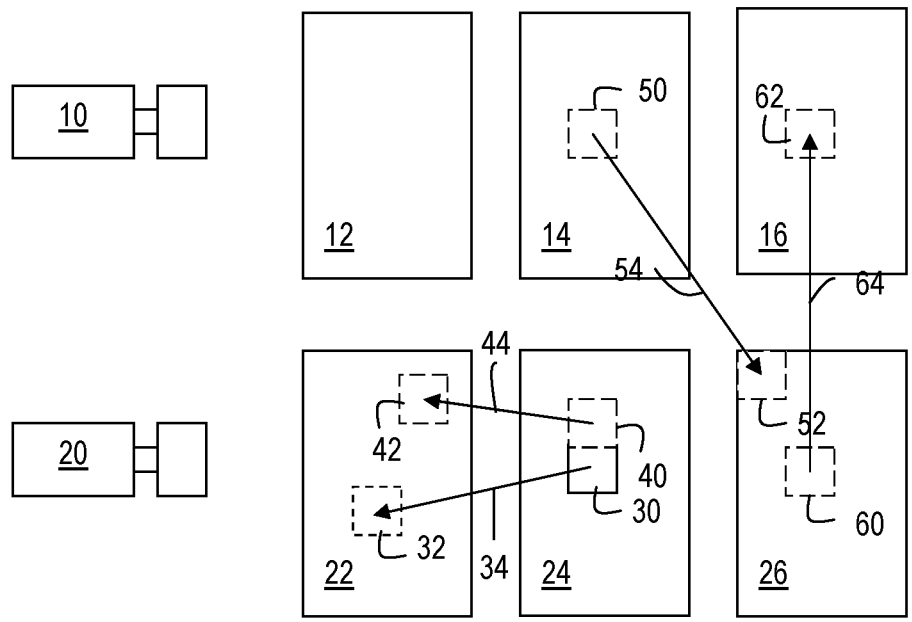
FIG. 10 illustrates motion vector prediction according to an embodiment for a multi-view video stream.

An aspect of the embodiments solves this problem by imposing a restriction when selecting candidate MV predictors for a current motion vector based on the MV type of the current motion vector. FIG. 4 is a flow diagram illustrating a method of motion vector prediction according to this aspect. The motion vector prediction as disclosed in FIG. 4 is applied to multi-view video coding of video content from multiple, i.e. at least two, camera views 10, 20, see FIG. 10. FIG. 10 illustrates an example of multi-view video coding with two camera views 10, 20 each recording a series of frames 12, 14, 16, 22, 24, 26 comprising pixel blocks 30, 40, 50, 60. In FIG. 10, reference numbers 40, 50, 60 denote already encoded pixel blocks for which a respective motion vector 44, 54, 64 pointing towards a respective pixel area 42, 52, 62 already are estimated.

In a general embodiment, the method comprises determining, in step S2, a motion vector type from multiple predefined motion vector types for a motion vector 34. This motion vector 34 is estimated for a current pixel block 30 in a current frame 24 of a current camera view 20 of the multiple camera views 10, 20. The motion vector 34 identifies a reference pixel area 32 in a reference frame 22. The motion vector type is determined in step S2 based on at least one of i) the current camera view 20 and a camera view 20 of the reference frame 22 among the multiple camera views 10, 20 and ii) a point in time of the current frame 24 and a point in time of the reference frame 22. The method also comprises identifying, in step S3, at least one candidate motion vector predictor 44, 54, 64 of the determined motion vector type and determining, in step S4, a motion vector predictor for the motion vector 34 based on the at least one candidate motion vector predictor 44, 54, 64.

Various implementation embodiments of this general embodiment will now be further disclosed herein.

The method of FIG. 4 starts in an optional but preferred step S1 where a motion vector 34 is estimated or predicted for a current pixel block 30 to be encoded in a current frame 24 of a current camera view 20. For example, the motion vector 34 may be estimated according to prior art techniques in a motion vector estimation or search procedure. Such a motion vector estimation normally involves comparing the pixel values of the current pixel block 30 with the pixel values in different candidate pixel areas. The candidate pixel area that leads to a smallest pixel value difference, such as giving the lowest SSD or SAD between the current pixel block 30 and the candidate pixel areas, is then selected as reference pixel area 32 for the current pixel block 30. This reference pixel area 32 is then identified, at least partly, by a motion vector 34 and optionally by a frame index. Thus, the motion vector 34 estimated in step S1 identifies a reference pixel area 32 in a reference frame 22 for the current pixel block 30. The reference frame 22 can be a frame of the same current camera view 20 as the current pixel block 30 but then in a previous frame 22 (or indeed in a following frame 26) of the current camera view 20, see FIG. 10. Alternatively, the reference frame belongs to a different camera view 10 of the multiple camera views 10, 20. Although, less common the reference frame could in fact be the current frame 24.

According to the embodiments, the motion vector 34 estimated in step S1 is not encoded in the bitstream directly. In clear contrast a MV predictor 44 is determined for the motion vector 34. This means that only the difference or residual between the MV predictor 44 and the motion vector 34 needs to be encoded. Alternatively, no residual needs to be encoded, such as in the skip mode, since the MV predictor 44 is used as representation for the estimated motion vector 34. This generally leads to more efficient encoding by exploiting redundancies between motion vectors. The following steps S2 to S4 are performed for the motion vector 34 in order to find an optimal MV predictor 44.

Step S2 determines the MV type for the motion vector 34 estimated in step S1. The MV type is determined from multiple predefined MV types. The determination of MV type in step S2 is then performed based on the current camera view 20 and the camera view 20 of the reference frame 22, denoted (current) reference camera view herein. Alternatively or in addition, the determination in step S2 is performed based on a point in time of the current frame 24 and the point in time of the reference frame 22. In the former case, the view numbers or identifiers of the current camera view 20 and the reference camera view 20 are typically compared. If they are different the motion vector points to the pixel area in the reference frame of a different camera view than the current camera view 20. The motion vector is then of the so-called inter-view MV type. If the view identifiers are not different the reference frame 22 instead belongs to the same camera view 20 as the current view 20 and the motion vector 34 estimated in step S1 is not of the inter-view MV type. Correspondingly, if the points in time of the current frame 24 and the reference frame 22 are different, the motion vector 34 estimated in step S1 points to a frame backwards or forwards in time relative the current frame 24. The motion vector 34 is then of the so-called temporal MV type.

A next step S3 identifies at least one, preferably multiple, candidate MV predictors 44, 54 for the current motion vector 34. According to the embodiments, this at least one candidate MV predictor 44, 54 is selected to be of the MV type determined in step S2. Thus, the candidate MV predictors 44, 54 identified for the current motion vector 34 are of the same MV type as the current motion vector 34.

The particular candidate MV predictors 44, 54 identified in step S3 are preferably identified at least partly based on the position of the current pixel block 30 in the current frame 24. In a particular embodiment, step S3 involves determining a set of multiple candidate MV predictors 44, 54, 64 for the current motion vector 34 and where this set determination is performed based on the position of the current pixel block 30. Furthermore, the set of multiple candidate MV predictors 44, 54, 64 is preferably determined also based on the point in time of the current frame 24 and the identifier or number of the current camera view 20 in addition to the position of the current pixel block 30.

In a particular embodiment, a next substep involves identifying those candidate MV predictors 44, 54 of the determined set that are of the same MV type as the current motion vector 34. In an embodiment, only these identified candidate MV predictors 44, 54 of the set are employed. Hence, any candidate MV predictors 64 of the set that are of a MV type different from the MV type of the current motion vector 34 as determined in step S2 are preferably discarded or ignored.

The set of multiple candidate MV predictors 44, 54, 64 could include both spatial candidate MV predictors, temporal candidate MV predictors 44, spatio-temporal candidate MV predictors 54 and inter-view candidate MV predictors 54, 64. Examples of how selecting the former ones are disclosed in document [1]. Thus, the determination of the set of multiple candidate MV predictors 44, 54, 64 is preferably performed based on at least one of i) motion vectors 44 associated with spatially neighboring pixel blocks 40 in the current frame 24, ii) motion vectors 64 associated with temporally neighboring pixel blocks 60 in frames 26 different from the current frame 24 but belonging to the current camera view 20, and iii) motion vectors 54 associated with pixel blocks 50 in frames 14 belonging to camera views 10 different from the current camera view 20 but having a respective point in time equal to the point in time of the current frame 24. Optionally, the determination of the set of multiple candidate MV predictors 44, 54, 64 could also be performed based on iv) motion vectors associated with pixel blocks in frames belonging to camera views different from the current camera view and having a respective point in time different from the point in time of the current frame. In a particular embodiment, the set comprises at least candidate MV predictors selected from ii) and iii) above.

The next step S4 determines a MV predictor for the current motion vector based on one of the candidate MV predictors identified in step S3. The particular candidate MV predictor to use as MV predictor can be determined, for instance, based on a rate-distortion criterion that reflects the trade-off between the additional cost of signaling the selected MV predictor and the gain obtained with a more accurate MV prediction. Examples of such rate-distortion criteria that can be used according to the embodiments are presented in section 3.1.2 of document [1], the teaching of which with regard to suitable rate-distortion criteria is hereby incorporated by reference. Other criteria than ratio-distortion criteria are also possible to use when determining the MV predictor in step S4, such as pure quality metrics, e.g. SSD or SAD.

A motion vector comprises an x coordinate or a horizontal component and a y coordinate or a vertical component. The method of FIG. 4 can then be used in a combined process to find a motion vector predictor for both vector components. In an alternative approach, the two components are handled separately. In such a case, steps S2 to S4 of FIG. 4 can be done sequentially or in parallel for each respective vector component. In such a case, the result of the method is a first MV predictor for the horizontal component and a second MV predictor for the vertical component of the motion vector.

The MV predictor determined in step S4 for the current motion vector is then, in an embodiment, used to calculate a residual motion vector. Thus, the residual motion vector is calculated based on the motion vector and the MV predictor and preferably as a difference therebetween. Optional scaling of the MV predictor can be applied prior to calculation of the residual motion vector, which is further disclosed herein.

In other embodiments, such as in the skip mode no residual motion vector is calculated. Thus, in the skip mode the decoder will use the MV predictor determined for a current pixel block without any MV difference or residual to refine the motion vector for that pixel block.

In some rare cases it could happen that no appropriate candidate MV predictor is available. Thus, all candidate MV predictors of the set are of MV types different from the MV typed determined for the current pixel block and motion vector in step S2. In such a case, a default MV predictor could be used instead. A typical example of such a default MV predictor could be the zero vector (0, 0).

In an embodiment of step S2 the MV type is determined to be a temporal MV type if the point of time of the current frame is different from the point of time of the reference frame. In such a case, step S3 identifies the candidate MV predictors to be motion vectors associated with a respective pixel block in a respective first frame and identifying a respective pixel area in a respective first reference frame having a point in time different from a point in time of the first frame but belonging to the same camera view as the first frame (see motion vector A in FIG. 2). In an optional embodiment, the candidate MV predictors could also be identified to be motion vectors associated with a respective pixel block in a respective first frame and identifying a respective pixel area in a respective first reference frame having a point in time different from the point in time of the first frame and belonging to a camera view that is different from the camera view of the first frame (see motion vector B in FIG. 2). The first frame could be equal to or different from the current frame. Correspondingly, the first reference frame could be equal to or different from the reference frame.

Thus, in this case when the current motion vector is of the temporal MV type, a most suitable candidate MV predictor would be motion vector A in FIG. 2. A secondary candidate MV predictor to be considered is motion vector B in FIG. 2 because it is actually a mixture of temporal motion and disparity. In such a case, in an optional embodiment the disparity component can be removed from the candidate MV predictor before putting it into the MV candidate list and use it as candidate MV predictor in step S3 so that only the temporal motion component remains. Hence, in such a case, an inter-view disparity component is removed from the candidate MV predictor if it comprises both a temporal and a disparity component. Motion vectors C and D are then ignored and not used as candidate MV predictors since they are of a different MV type.

The disparity component can be removed according to various embodiments. For instance, the disparity component of the candidate MV predictor can be deducted from an associated depth map that defines the distance between a camera view and a captured scene. As is known in the art of multi-view video coding, such depth maps are typically estimated or captured and used together with video frames carrying video data. In particular depth maps and video frames from different camera views can be used to synthesize virtual or new camera views. In this case, such a depth map is employed to determine the disparity component that is to be removed from the candidate MV predictor.

In an alternative approach a so called global disparity can be used. The global disparity then represents the average disparity between two camera views. Such a global disparity can be used as a good representation of the disparity component to be removed from the candidate MV predictor.

A further variant is to look at inter-view motion vectors in neighboring pixel blocks in order to get an estimation of the disparity component.

Yet another alternative is to determine the disparity component based on a combination of at least two of the above presented embodiments.

In another embodiment of step S2, the MV type for the current motion vector is determined to be an inter-view MV type if the current camera view is different from the current reference camera view of the reference frame. Step S3 then involves identifying candidate MV predictors associated with a respective pixel block in a respective first frame of a respective first camera view and identifying a respective pixel area in a respective first reference frame having a point in time equal to a point in time of the first frame but belonging to a camera view different from the first camera view (motion vector C in FIG. 2). In an optional embodiment, the candidate MV predictors could also be identified to be motion vectors associated with a respective pixel block in a respective first frame and identifying a respective pixel area in a respective first reference frame having a point in time different from the point in time of the first frame and belonging to a camera view different from the first camera view (motion vector B in FIG. 2). Motion vectors A and D are then ignored and not used as candidate MV predictors since they are of a different MV type as compared to the current motion vector.

In similar to the temporal embodiment described in the foregoing, motion vector C only carries a disparity component and is therefore a very good candidate MV predictor. Motion vector B is a mixture of a motion component and a disparity component. In an optional step, the temporal motion component is then first removed prior to using the motion vector B as candidate MV predictor.

A representation of the temporal component to be removed from motion vector B in the present example can be determined from temporal inter-view MV in neighboring pixel blocks in the current frame.

Categorizing and classifying motion vectors in different MV types and restricting candidate MV predictor selection based on MV types reduces the amount of candidate MV predictors that need to be evaluated. This implies reduced complexity. At the same time, coding efficiency can be improved since a reduced number of candidates results in smaller total amount of entries to be indexed so a shorter codeword can be assigned to represent the index and MV predictor selection. Also embodiments that do not use MV competition would benefit from using a MV predictor that is of the same MV type as the motion vector of the current pixel block. The reason is that then a better MV predictor would used. For instance, the H.264 median prediction could be used. However, in this case the median operation is performed preferably only based on those candidate MV predictors that are of the same type as the motion vector of the current pixel block. For instance, if the current pixel block has a motion vector of temporal MV type. In such a case, the median operation could be performed on motion vectors of selected pixel blocks, where these motion vectors are of the temporal MV type. Hence, in this example any motion vectors of selected pixel blocks that are of the inter-view MV type are not considered in the H.264 median prediction.

Figure 5:
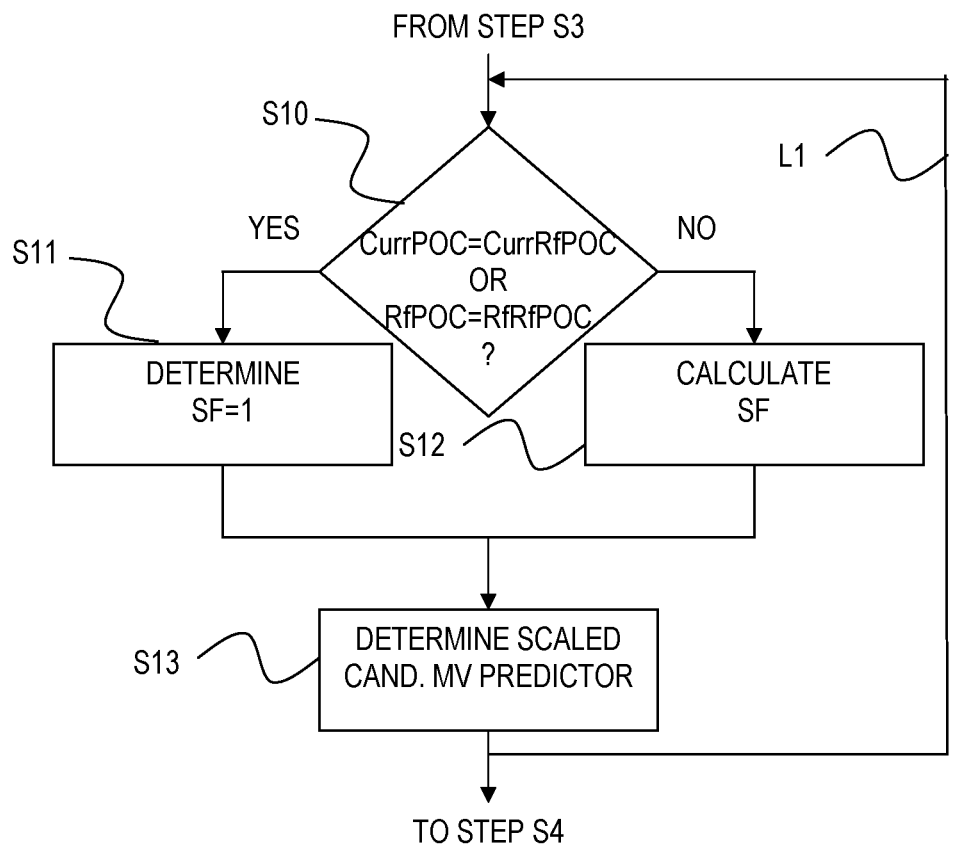
FIG. 5 is a flow diagram illustrating additional steps of the method in FIG. 4 according to an embodiment.

A further problem when applying motion vector prediction to multi-view video coding is that the previously discussed scaling formula used in prior art MV prediction can result in zero or indefinite scaling factors depending on the POCs of the current frame, the reference frame and the frames of the MV predictor. FIG. 5 is a flow diagram illustrating additional steps of the method in FIG. 4 that solves these scaling factor problems.

In this particular embodiment, the current frame has a current picture order count (POC) and the reference frame has a corresponding reference picture order count. The reference frame can be equal to or different from the current frame.

The method continues from step S3 of FIG. 4, where at least one candidate motion vector (MV) predictor of the determined motion vector type has been identified as previously disclosed herein. The at least one candidate MV predictor is associated with a respective pixel block in a respective first frame having a respective first POC and identifying a respective pixel area in a respective first reference frame having a respective first reference POC.

A next step S10 compares the current POC (CurrPOC) with the reference POC (CurrRfPOC) and compares the first POC (RfPOC) with the first reference POC (RfRfPOC). If the current POC is equal to the reference POC or the first POC is equal to the first reference POC the method continues from step S10 to step S11. This step S11 determines the scaling factor (SF) for the current candidate MV predictor to be equal to a fixed predefined value, preferably equal to one. However, if the current POC is different from the reference POC and the first POC is different from the first reference POC in step S10 the method instead continues to step S12, which preferably calculates the scaling factor based on the current POC, the reference POC, the first POC and the first reference POC. In a particular embodiment, the scaling factor is calculated in step S12 based on and preferably as:

$$\text{scaling factor} = \frac{CurrPOC - CurrRfPOC}{RfPOC - RfRfPOC}$$

A next step S13 determines a scaled candidate MV predictor for the current candidate MV predictor based on the scaling factor and the candidate MV predictor. The scaled candidate MV predictor is thereby typically an upscaled or downscaled version of the candidate MV predictor, possibly pointing at an opposite direction as compared to the candidate MV predictor. The scaled candidate MV predictor is preferably obtained by multiplying the candidate MV predictor with the scaling factor.

The loops of steps S10 to step S13 is then preferably repeated for all candidate MV predictors identified in step S3, which is schematically illustrated by the line L1. Thus, in such a case a respective scaling factor is preferably determined to be equal to the fixed predefined value, preferably one, or calculated according to above for each candidate MV predictor provided for the current motion vector. These scaling factors are then employed in step S13 to scale the respective candidate MV predictors up or down by multiplying each candidate MV predictor with its respective scaling factor.

The method then continues to step S4 of FIG. 4, where a MV predictor is determined for the current motion vector and where this MV predictor is based on the at least one scaled candidate MV predictor from step S13. The determination of the MV predictor in step S4 is preferably conducted based on the previously described rate-distortion criterion and using the scaled candidate MV predictors. Thus, the scaled candidate MV predictor resulting in the optimal rate-distortion for the current motion vector among the tested scaled candidate MV predictors is determined to be the MV predictor for the current motion vector in step S4.

In a particular embodiment, the current camera view is different from the reference camera view and a camera view of the first frame is different from a camera view of the first reference frame. However, note that the current camera view could be equal to the camera view of the first frame (or of the first reference frame) and/or the reference camera view could be equal to the camera view of the first reference frame (or of the first frame). In such a case, a composite scaling factor can be determined for the candidate MV predictor. Such a composite scaling factor is calculated based on and preferably equal to the previously mentioned scaling factor determined in step S11 or calculated in step S12 multiplied by $$\frac{CV - RV}{V1 - RV1},$$

wherein CV denotes the current camera view, RV denotes the reference camera view, V1 denotes the camera view of said first frame and RV1 denotes the camera view of the first reference frame. Hence, in this embodiment the candidate MV predictors are not only scaled according to their reference distance but also according to their view distance.

A scaled MV predictors is then determined to be equal to the candidate MV predictor scaled by its composite scaling factor and is therefore based on and preferably equal to the candidate MV predictor multiplied by the composite scaling factor. If the formula above for the view distance would result in a zero or indefinite value, i.e. if CV=RV and/or V1=RV1, the scaling factor could be based only on reference distance or the view distance part of the scaling factor could be set to a fixed predefined value, preferably one.

The camera view parameters are typically identifiers or numbers of the camera views and can be determined based on a geometrical relationship of the current camera view, the reference camera view and the camera views of the first frame and the first reference frame. For instance, the camera views can be indexed or numbered in a linear way if the camera positions vary linearly with the index. In a more general way, the camera view parameters are defined based on geometric camera positions, such as based on camera distances, and optionally including three-dimensional geometries to handle camera tilt or rotation.

Once the MV predictor has been determined for the current motion vector a residual motion vector can be calculated as previously described herein.

When a current inter-view motion vector is predicted from an inter-view MV predictor and applying the prior art formula of calculating scaling factor a scaling factor of zero and thereby a zero MV predictor can be obtained, which is usually undesirable. Even worse, division by zero is possible which result in an unresolved value that will lead to coder crash. The embodiments discussed above in connection with FIG. 5 solve these problems by setting the scaling factor to a fixed predefined value in special cases where problems otherwise can occur.

Figure 3:
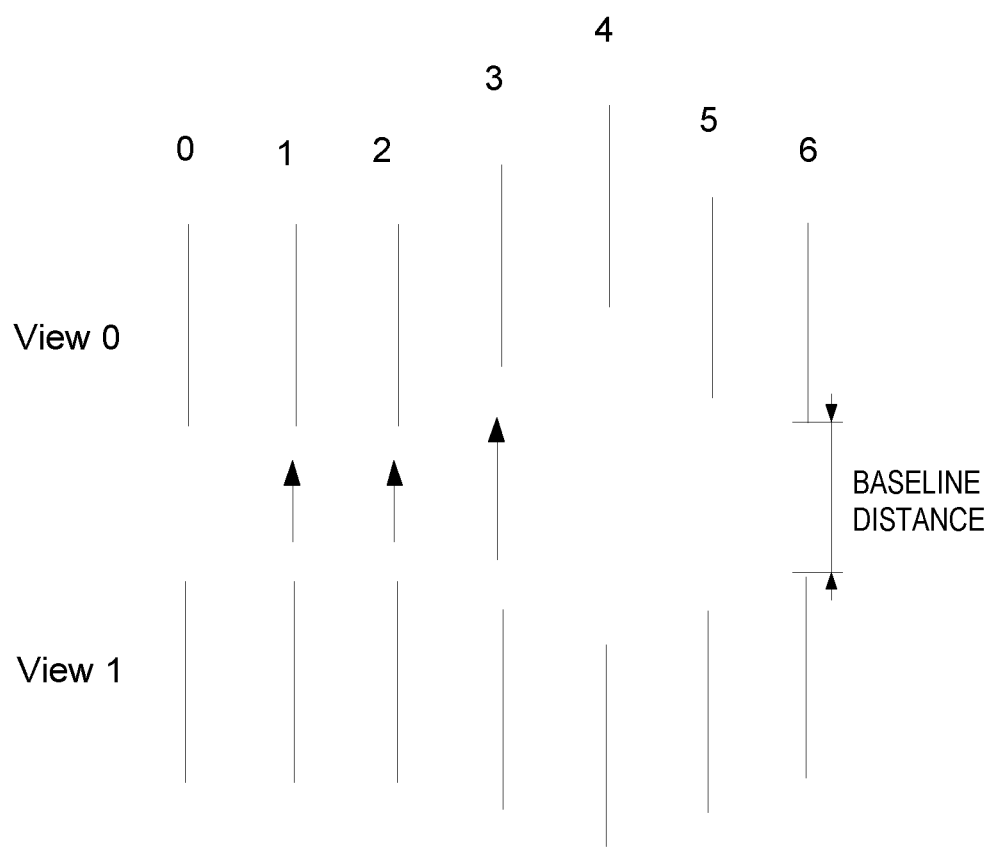
FIG. 3 illustrates a set of changing baseline distances between camera views.
Figure 6:
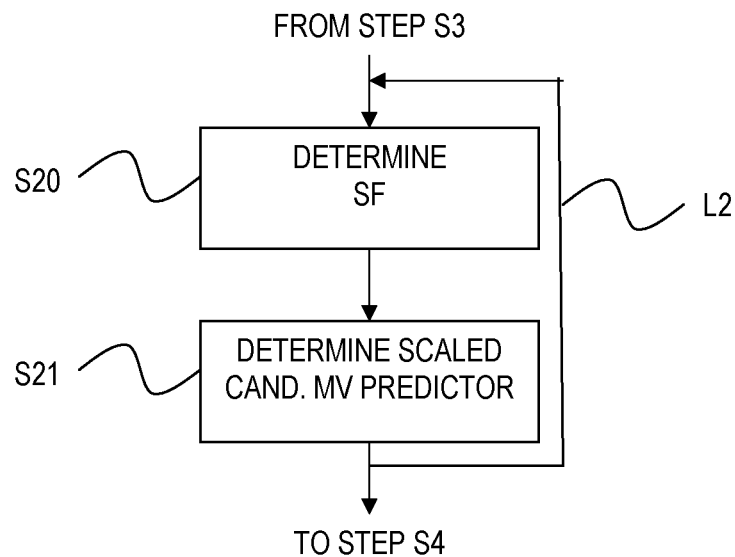
FIG. 6 is a flow diagram illustrating additional steps of the method in FIG. 4 according to another embodiment.

A further problem of motion vector prediction in multi-view video is that an inter-view motion vector is highly related to the baseline distance between camera views. FIG. 3 illustrates this concept. In this example the baseline distances are changing for a stereoscopic representation, i.e. having two camera views. The baseline distances are the same for frame 0, 1, 2. It begins to increase at frame 3 and peaks at frame 4 and finally drops back to the previous distance at frame 6. Disparity is usually proportional to baseline distances. Thus, when the baseline distance is multiplied by a certain factor, the corresponding disparity is likely to also be multiplied by the same factor. Hence, when an inter-view motion vector in frame 3 needs to be predicted from another inter-view motion vector in frame 2, it would be advantageous to scale the motion vector predictor by a factor that reflects the amount that the baseline distance scales. This is achieved in an embodiment as disclosed in the flow diagram of FIG. 6. FIG. 6 illustrates additional steps of the method in FIG. 4. In a particular embodiment the current camera view is different from the reference camera view.

The method continues from step S3 of FIG. 4, where at least one candidate MV predictor of the determined motion vector type has been identified for the motion vector. Each such candidate MV predictor is associated with a respective pixel block in a respective first frame of a respective first camera view and identifies a respective pixel area in a respective first reference frame of a respective first reference camera view. In a particular embodiment the first camera view is different from the first reference camera view.

A next step S20 determines a scaling factor for the at least one candidate MV predictor identified in step S3. According to an embodiment the scaling factor is determined based on a baseline distance between the current camera view and the reference camera view and the baseline distance between the first camera view and the first reference camera view. It could be possible that the baseline distances are changing and thereby different at different point of times as disclosed in FIG. 3. Hence the baseline distance between the current camera view and the reference camera view is preferably the current baseline distance as determined at the point in time for the current frame. Correspondingly, the baseline distance between the first camera view and the first reference camera view is preferably the baseline distance as determined at the point in time for the first frame.

A next step S21 determines a scaled candidate MV predictor for the current candidate MV predictor based on the candidate MV predictor and the scaling factor determined in step S20. In a particular embodiment, the scaled candidate MV predictor is determined based on and preferably equal to the candidate MV predictor multiplied by the scaling factor to thereby get a (up/down) scaled candidate MV predictor. This step S21 is basically performed in the same way as step S13 in FIG. 5. The loop of steps S20 and S21 as indicated by the line L2 is then performed for each provided candidate MV predictor to thereby get at least one but preferably multiple scaled candidate MV predictors, which have been scaled based on the baseline distances between the different camera views.

The method then continues to step S4 of FIG. 4, which determines a MV predictor for the current motion vector based on the at least one scaled candidate MV predictor obtained from step S21. Step S4 preferably involves selecting the scaled candidate MV predictor resulting in the best rate-distortion parameter value as previously disclosed herein.

In a particular embodiment, the determination of the scaling factor in step S20 comprises determining the scaling factor based on a quotient between the baseline distance between the current camera view and the reference camera view and the baseline distance between the first camera view and the first reference camera view.

In another particular embodiment a composite or multi-component scaling factor can be determined for the at least one candidate MV predictor. Such a scaling factor could then be based on, preferably equal to, α×β, wherein α is determined based on the baseline distance between the current camera view and the reference camera view and the baseline distance between the first camera view and the first reference camera view, and $$\beta = \frac{CV - RV}{V1 - RV1},$$

wherein CV denotes the current camera view, RV denotes the reference camera view, V1 denotes the first camera view and RV1 denotes the first reference camera view. In a preferred embodiment $$\alpha = \frac{BL_C}{BL_1}$$

and in another embodiment $$\alpha = \frac{BL_1}{BL_C},$$

wherein $BL_C$ denotes the baseline between the current camera view and the reference camera view and $BL_1$ baseline distance between the first camera view and the first reference camera view. In a particular embodiment, $BL_C$=CV−RV and $BL_1$=V1−RV1 so that the two parameters α, β are basically the same. No composite scaling factor is then preferably calculated as α×β.

Determining the scaling factors for the candidate MV predictors to be based on and proportional to the baseline distance for a varying baseline distance scenario improves the coding efficiency of the motion vectors.

Figure 7:
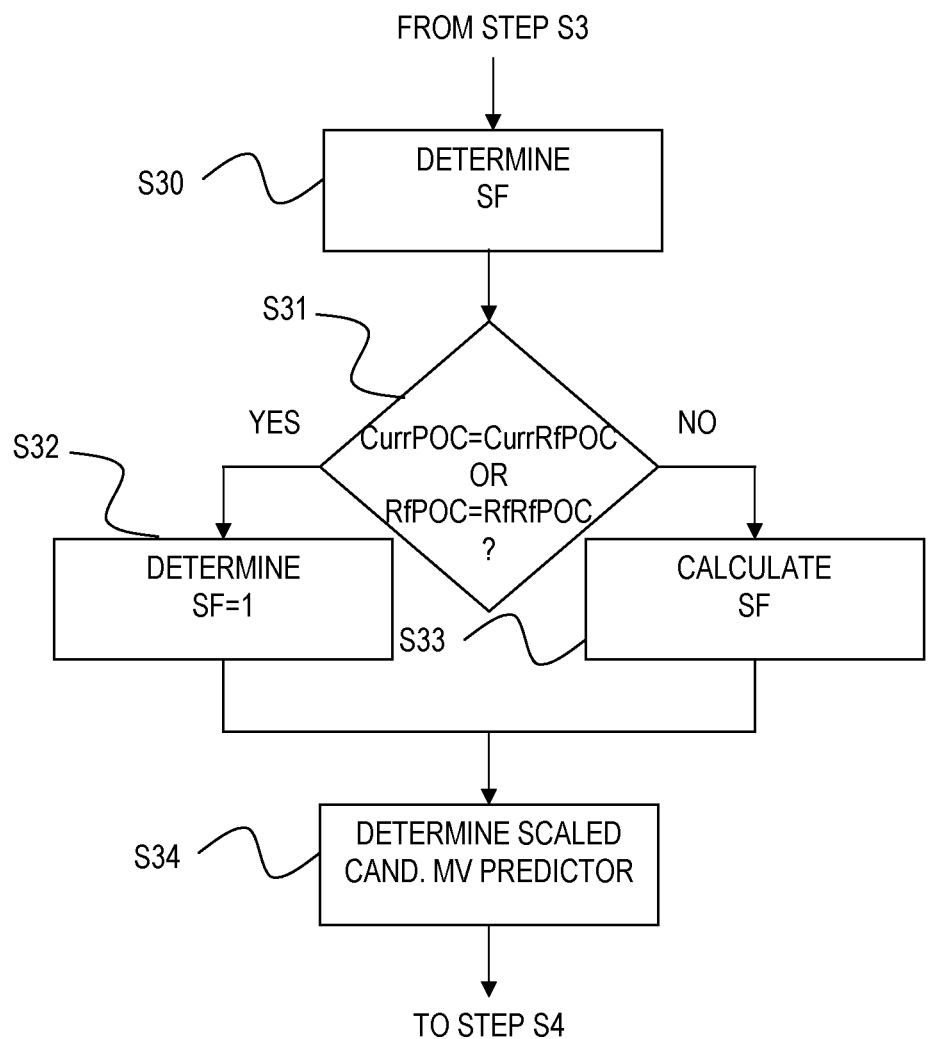
FIG. 7 is a flow diagram illustrating additional steps of the method in FIG. 4 according to a further embodiment.

The present embodiment of determining scaling factor can be combined with the scaling factor determination disclosed in the foregoing in connection with FIG. 5. FIG. 7 illustrates such an approach. The method then continues from step S3 in FIG. 4. A next step S30 determines a first scaling factor for a candidate MV predictor based on baseline distances. This step S30 is performed as disclosed above in connection with step S20 in FIG. 6. The method continues by determining a second scaling factor in steps S31, S32 and S33. These steps S31, S32 and S33 are performed in a same way as steps S10, S11 and S12 in FIG. 5. The method then continues to step S34 where a scaled candidate MV predictor is determined based on the candidate MV predictor multiplied by the first scaling factor multiplied by the second scaling factor. The method then continues to step S4 of FIG. 4.

Hence, in this embodiment a composite scaling factor is used which is basically a product of the first scaling factor as obtained in step S30 and as disclosed in FIG. 6 and the second scaling factor as obtained in steps S31, S32 and S33 and as disclosed in FIG. 5. The determination of the first scaling factor in step S30 and the determination of the second scaling factor in steps S31-S33 can be performed serially in any order or at least partly in parallel.

Hence, in such a case a composite scaling factor for candidate MV predictor for which the current POC is equal to the reference POC and/or the POC of the first frame is equal to the POC of the first reference frame is preferably based on, and preferably equal to, k×α or k×α×β, wherein k denotes the fixed predefined value and is preferably equal to one and α,β are defined above. Correspondingly, if the current POC is not equal to the reference POC and the POC of the first frame is not equal to the POC of the first reference frame then the composite scaling factor is preferably determined based on, preferably equal to, α×χ or α×β×χ, wherein $$\chi = \frac{CurrPOC - CurrRfPOC}{RfPOC - RfRfPOC}.$$

In these cases, the candidate MV predictors are scaled according to reference distances, view distances and baseline distances.

Figure 8:
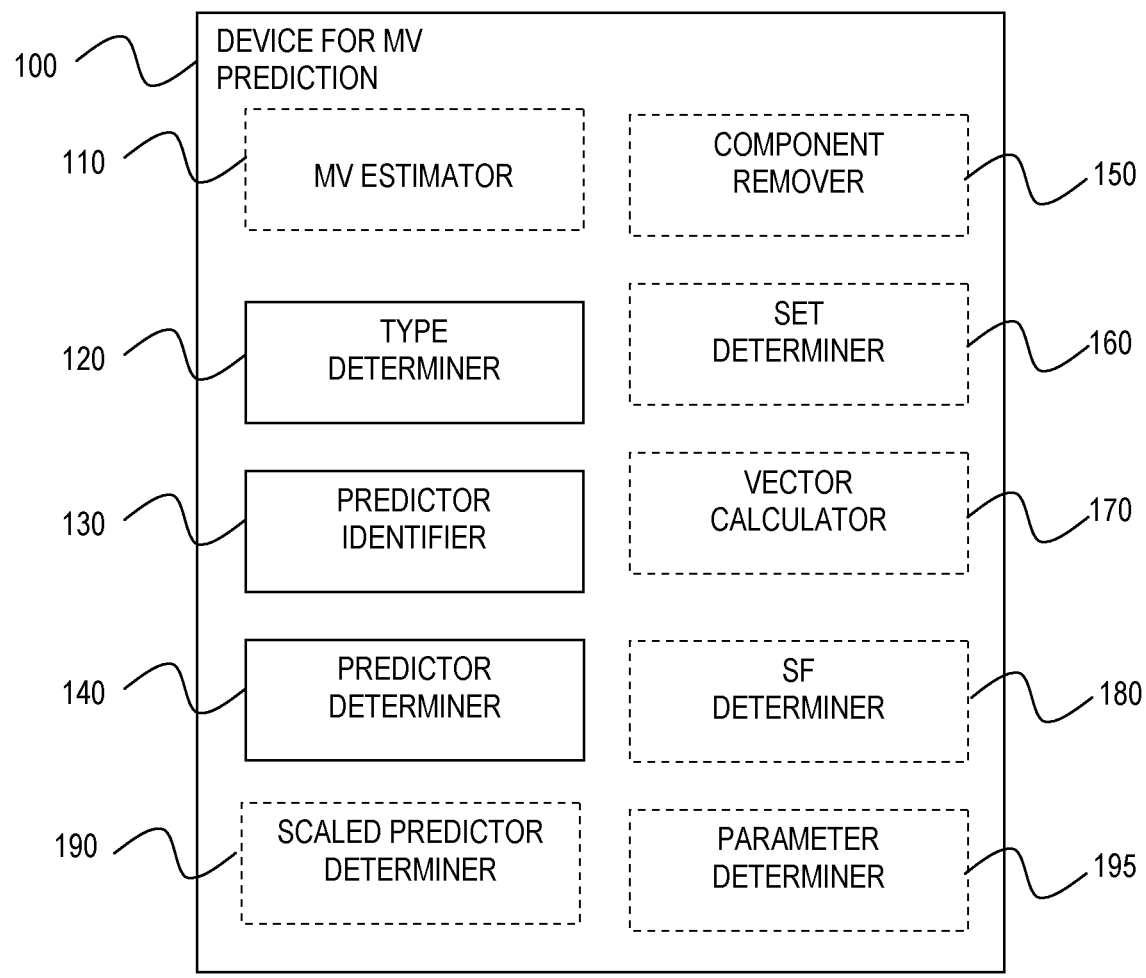
FIG. 8 is a schematic block diagram of a device for motion vector prediction according to an embodiment.

FIG. 8 is a schematic block diagram of a device 100 for motion vector prediction according to an embodiment of this aspect. The device 100 optionally comprises a MV estimator or predictor 110 configured to estimate or predict a motion vector for a current pixel block in the current frame of the current camera view. The estimated motion vector identifies a reference pixel area in a reference frame. A type determiner 120 is employed by the device 100 to determine a MV type from multiple predefined MV types for the motion vector predicted by the MV predictor 110. The type determiner 120 performs this type determination based on at least one of the i) current camera view and the camera view of the reference frame and ii) the point in time of the current frame and the point in time of the reference frame. A predictor identifier 130 is configured to identify at least one candidate MV predictor for the predicted motion vector and where the candidate MV predictor(s) is(are) of the same MV type as the current motion vector as determined by the type determiner 120. The device 100 further comprises a predictor determiner 140 configured to determine a MV predictor for the current motion vector based on the at least one candidate MV predictor identified by the predictor identifier 130 as previously disclosed herein.

In a particular embodiment, the type determiner 120 is configured to determine the MV type to be a temporal MV type if the point of time of the current frame is different from the point of time of the reference frame. The predictor identifier 130 is then configured to identify candidate MV predictors among already predicted motion vectors associated with a respective pixel block in a respective first frame and identifying a respective pixel area in a respective first reference frame having a point in time different from the point in time of the first frame but belonging to the same camera view as the first frame. Optionally, the already predicted motion vector could identify a respective pixel area in a respective first reference frame having a point in time different from the point in time of the first frame and belonging to a camera view different from the camera view of the first frame.

In an embodiment, the device 100 comprises an optional component remover 150 that is configured to remove an inter-view disparity component from a candidate MV predictor if the MV type determined by the type determiner 120 is a temporal MV type and the candidate MV predictor is a mixture of temporal motion and disparity.

The type determiner 120 is correspondingly configured to determine the MV type to be an inter-view MV type if the current camera view is different from the camera view of the reference frame. The predictor identifier 130 is then configured to identify the candidate MV predictor among already predicted motion vectors associated with a pixel block in a first frame of a first camera view and identifying a pixel area in a first reference frame having a point in time equal to the point in time of the first frame but belonging to a camera view different from the first camera view. Optionally, the already predicted motion vectors could identify a pixel area in a first reference frame having a point in time different from the point in time of the first frame and belonging to a camera view different from the first camera view.

In an embodiment the optional component remover 150 is configured to remove a temporal motion component from a candidate MV predictor if the current MV type of the current motion vector is an inter-view MV type and the candidate MV predictor is a mixture of temporal motion and disparity.

In a particular embodiment, the predictor identifier 130 is configured to identify the candidate MV predictors from a set of multiple candidate MV predictors as previously discussed. This set is then determined based on a position of the current pixel block in the current frame, the point in time of the current frame and the identifier or number of the current camera view. An optional set determiner 160 can be implemented in the device 100 to determine the set of multiple candidate MV predictors based on i) motion vectors associated with spatially neighboring pixel blocks in the current frame, ii) motion vectors associated with temporally neighboring pixel blocks in frames different from the current frame but belonging to the current camera view, and/or iii) motion vectors associated with pixel blocks in frames belonging to camera views different from the current camera view but having a respective point in time equal to said point in time of the current frame. In an optional embodiment, the set could also include motion vectors associated with pixel blocks in frames belonging to camera views different from the current camera view and having a respective point in time different from the point in time of the current frame.

The device 100 preferably also comprises a vector calculator 170 configured to calculate a residual motion vector based on the motion vector predicted by the MV predictor 110 and the MV predictor determined by the predictor determiner 140. If operating according to the skip mode, no residual motion vector needs to be calculated.

In an embodiment, the device 100 also comprises a scaling factor (SF) determiner 180, a scaled predictor determiner 190 and optionally a parameter determiner 195.

In an embodiment, the SF determiner 180 is configured to determine a respective scaling factor for the at least one candidate MV predictor identified by the predictor identifier 130. The SF determiner 180 is configured, in this embodiment, to determine the scaling factor to be equal to a fixed predefined value, preferably one, if a current POC of the current frame is equal to a reference POC of the reference frame or if a first POC of the first frame is equal to a first reference POC of the first reference frame.

In a particular embodiment the SF determiner 180 calculates the scaling factor to be based on $$\frac{CurrPOC - CurrRfPOC}{RfPOC - RfRfPOC}$$

if the current POC is different from the reference POC and if the first POC is different from the first reference POC.

The scaling factor determined by the SF determiner 180 is then employed to scale the associated candidate MV predictor to form a scaled candidate MV predictor by the scaled predictor determiner 190. This scaled candidate MV predictor is preferably obtained based on multiplying the candidate MV predictor with the determined scaling factor.

The predictor determiner 140 then determines a MV predictor for the motion vector among the scaled candidate MV predictors determined by the scaled predictor determiner 190. The predictor determiner 140 preferably performs this motion vector determination or selection based on the previously discussed rate-distortion metric or criterion.

In a particular embodiment, the SF determiner 180 is configured to determine a composite scaling factor to be based on the above described scaling factor multiplied by $$\frac{CV - RV}{V1 - RV1}.$$

Hence the composite scaling factor is either $$\frac{CV - RV}{V1 - RV1}$$

or $$\frac{CurrPOC - CurrRfPOC}{RfPOC - RfRfPOC} \times \frac{CV - RV}{V1 - RV1}$$

depending of the POCs of the current frame, the reference frame, the first frame and the first reference frame. In this example, the fixed predefined value is exemplified by one. The scaled predictor determiner 190 is then configured to determine the scaled candidate MV predictor for a candidate MV predictor to be based on and preferably equal to the candidate MV predictor multiplied by the composite scaling factor.

In an optional embodiment, the device 100 comprises an optional parameter determiner 195 configured to determine the view parameters CV, RV, V1 and RV1 based on a geometric relationship of the current camera view, the reference camera view, the camera view of the first frame and the camera view of the first reference frame relative to a scene.

In an alternative embodiment, the SF determiner 180 is configured to determine a respective scaling factor for the at least one candidate MV predictor identified by the predictor identifier 130 to be based on the baseline distance between the current camera view and the reference camera view and the baseline distance between the first camera view and the first reference camera view.

The scaling factor determined by the SF determiner 180 is then employed to scale the associated candidate MV predictor to form a scaled candidate MV predictor by the scaled predictor determiner 190. This scaled candidate MV predictor is preferably obtained based on multiplying the candidate MV predictor with the determined scaling factor. The predictor determiner 140 then determines a MV predictor for the motion vector among the scaled candidate MV predictors determined by the scaled predictor determiner 190.

In a particular embodiment, the SF determiner 180 is configured to determine the scaling factor based on a quotient between the baseline distance between the current view and the reference view and the baseline distance between the first view and the first reference view.

In various embodiments, the SF determiner 180 could be configured to determine the scaling factor to be based on or equal to $\alpha \times \beta$ in order to make the scaling factor a function of view distances and baseline distances, based on or equal to k×α or α×χ in order to make the scaling factor a function of reference distances and baseline distances or based on or equal to k×α×β or α×β×χ in order to make the scaling factor a function of reference distance, view distances and baseline distances.

The device 100 can be implemented in hardware, in software or a combination of hardware and software. The device 100 can be implemented in a user equipment, such as a mobile telephone, tablet, desktop, notebook, multimedia player, video streaming server, set-top box or computer. The device 100 may also be implemented in a network device in the form of or connected to a network node, such as radio base station, in a communication network or system. The device 100 is advantageously implemented as a part of an encoder for encoding multi-view video content.

Although the respective unit 110-195 disclosed in conjunction with FIG. 8 have been disclosed as physically separate units 110-195 in the device 100, and all may be special purpose circuits, such as ASICs (Application Specific Integrated Circuits), alternative embodiments of the device 100 are possible where some or all of the units 110-195 are implemented as computer program modules running on a general purpose processor. Such an embodiment is disclosed in FIG. 9.

Figure 9:
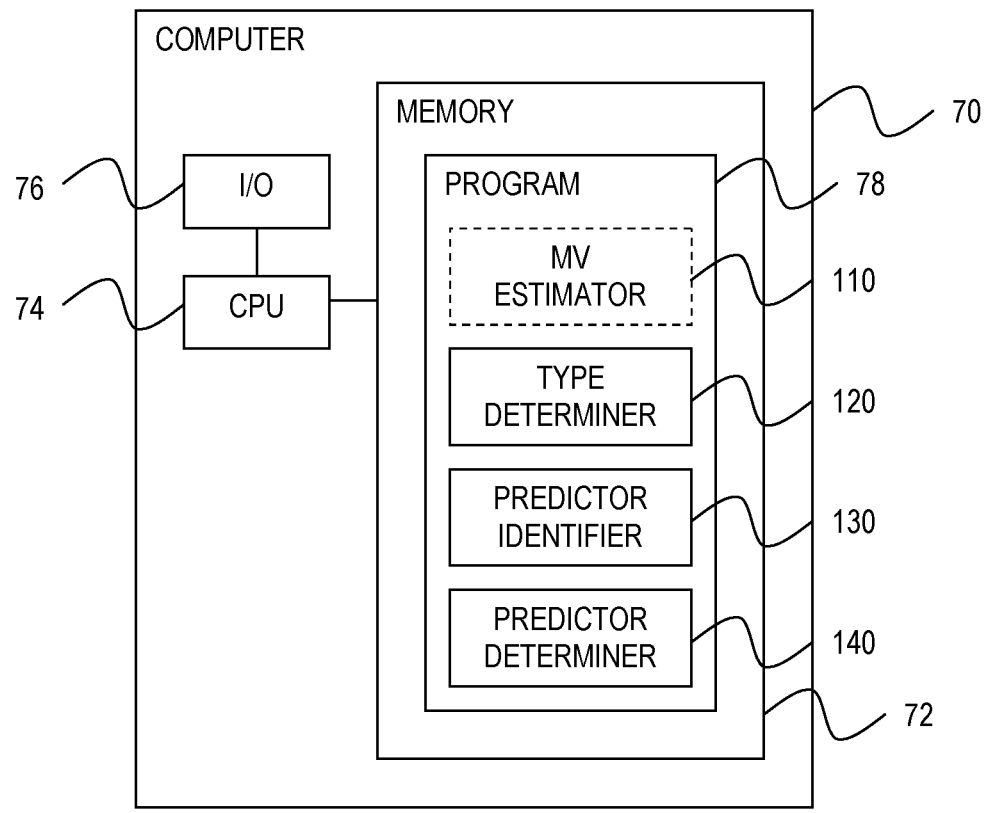
FIG. 9 is a schematic block diagram illustrating a computer comprising a computer program product with a computer program for motion vector prediction according to an embodiment.

FIG. 9 schematically illustrates an embodiment of a computer 70 having a processing unit 74, such as a DSP (Digital Signal Processor) or CPU (Central Processing Unit). The processing unit 74 can be a single unit or a plurality of units for performing different steps of the method described herein. The computer 70 also comprises an input/output (I/O) unit 76 for receiving recorded or generated video frames of the multiple views and outputs motion vector predictors, or an encoded bitstream of encoded multi-view video content. The I/O unit 76 has been illustrated as a single unit in FIG. 9 but can likewise be in the form of a separate input unit and a separate output unit.

Furthermore, the computer 70 comprises at least one computer program product in the form of a non-volatile memory 72, for instance an EEPROM (Electrically Erasable Programmable Read-Only Memory), a flash memory or a disk drive. The computer program product comprises a computer program 78, which comprises code means which when run on or executed on or by the computer 70, such as by the processing unit 74, causes the computer 70 to perform the steps of the method described in the foregoing in connection with FIG. 4. Hence, in an optional embodiment the code means in the computer program 78 comprises a MV estimating or predicting module or MV estimator or predictor 110 for estimating or predicting a motion vector, a type determining module or type determiner 120 for determining MV type, a predictor identifying module or predictor identifier 130 for identifying the candidate MV predictors and a predictor determining module or predictor determiner 140 for determining the MV predictor. These modules 110-140 essentially perform the steps of the flow diagram in FIG. 4 when run on the processing unit 74. Thus, when the different modules 110-140 are run on the processing unit 74 they correspond to the corresponding units 110-140 of FIG. 8.

The computer program 78 may additionally comprise a component removing module or component remover, a set determining module or set determiner, a vector calculating module or vector calculator, a SF determining module or SF determiner, a scaled predictor determining module or scaled predictor determiner and/or a parameter determining module or parameter determiner as disclosed in connection with FIG. 8.

Figure 11:
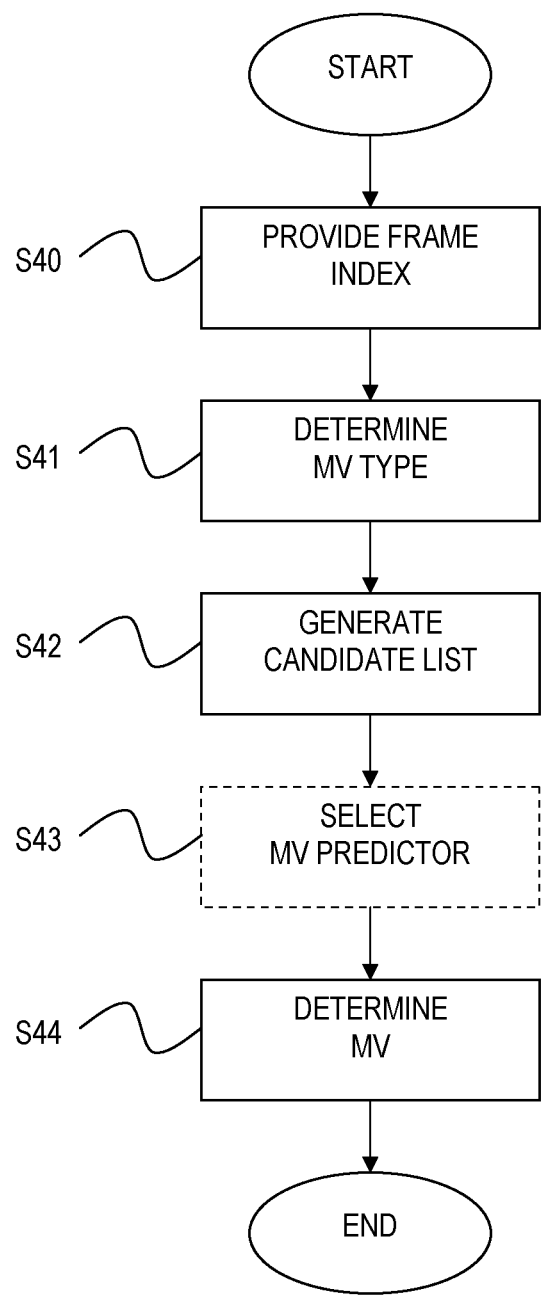
FIG. 11 is a flow diagram illustrating a method of motion vector decoding according to an embodiment.

A related aspect of the embodiments defines a method of motion vector decoding for encoded multi-view video from multiple camera views. FIG. 11 is a flow diagram illustrating such a method.

In a general embodiment, the method starts in step S40 that provides, for a current pixel block in a current frame of a current camera view of the multiple camera views, a reference frame index identifying a reference frame. The method also comprises determining, in step S41, a motion vector type from multiple predefined motion vector types for the current pixel block and based on at least one of i) the current camera view and a camera view of the reference frame among the multiple camera views, and ii) a point in time of the current frame and a point in time of the reference frame. A candidate list comprising at least one candidate motion vector predictor of the determined motion vector type is generated in step S42. The method also comprises determining, in step S44, a motion vector for the current pixel block based on a candidate motion vector predictor of the candidate list.

Various implementation embodiments of this general embodiment will now be further disclosed herein.

The method as shown in FIG. 11 starts in step S40 where a reference frame index is provided for a current pixel block to be decoded in a current frame of a current camera view. This reference frame index identifies a reference frame for the current pixel block. Normally, this reference frame may comprise a pixel area that is to be used as a predictor for the current pixel block during the decoding. The reference frame index is generally retrieved from the bitstream and in more detail from the encoded representation of the current pixel block or the encoded representation of the current frame. A next step S41 determines a MV type from the multiple predefined MV types for the current pixel block. This step S41 is performed basically as disclosed in step S2 of FIG. 4 and is therefore not described further herein. A next step S42 generates a candidate list for the current pixel block. This candidate list comprises at least one, preferably multiple, candidate MV predictors. According to this aspect the candidate MV predictors are furthermore of the MV type determined in step S41. Thus, the candidate list preferably only comprises candidate MV predictors that are of the same MV type as determined for the current pixel block.

Finally, step S44 determines a motion vector for the current pixel block based on a candidate MV predictor of the candidate list. The motion vector determined in step S44 then enables identification of the pixel area in the reference frame that is to be used as a predictor for the current pixel block. Thus, the pixel values of the current pixel block are then preferably obtained by adding the pixel values of the identified pixel area to residual pixel values obtained from the bitstream and preferably from the encoded representation of the current pixel block.

In a particular embodiment, the method of FIG. 11 comprises the optional step S43. This step S43 selects a MV predictor for the current pixel block from the at least one candidate MV predictor listed in the candidate list. This MV predictor is preferably selected based on a predictor index associated with the current pixel block and included in the bitstream, such as in the encoded representation of the current pixel block. In such an embodiment, step S44 determines the motion vector for the current pixel block based on the MV predictor selected in step S43 and a residual motion vector associated with the current pixel block. This residual motion vector is obtained from the bitstream and preferably from the encoded representation of the current pixel block. In a particular embodiment, the motion vector is obtained by adding the selected MV predictor to the residual motion vector.

In other embodiments, no residual motion vector is included for the current pixel block in the bitstream. For instance, according to the skip mode there is no residual motion vector that will refine the MV predictor for the pixel block. In clear contrast, one or several of the MV predictors from the candidate list generated in step S42 and which are of the MV type as determined in step S41 will be used as basis for the motion vector determined in step S44 for the pixel block. For instance, the candidate list could include motion vector of the determined MV type associated with spatially neighboring pixel blocks in the current frame, associated with temporally neighboring pixel blocks in other frames than the current frame but in the current camera view and/or associated with pixel blocks present in frames having a same point of time as the current frame but belonging to other camera views that the current camera view. In such a case, the motion vector of the pixel block could be determined based on at least one of these candidate MV predictors. In an embodiment, the motion vector is determined to be equal to or at least based on the median MV of the at least one candidate MV predictors or the average MV of the at least one candidate MV predictors. Thus, in an embodiment, the MV determined in step S44 could be the H.264 median predictor but where this H.264 median predictor is obtained among a candidate list of candidate MV predictors that are of the determined MV type. Thus, in a particular embodiment the H.264 median prediction procedure is preferably limited to be performed among candidate MV predictors that are of the determined MV type. For instance, if the MV type determined in step S41 is of the temporal MV type and the decoder is configured to provide candidate MV predictors from spatially neighboring pixel blocks in the current frame, then preferably only those motion vectors of the neighboring pixel blocks that are of the temporal MV type are available as candidate MV predictors and included in the generated candidate list.

As previously discussed herein, the MV type determined in step S41 indicates a temporal MV type when the point of time of the current frame is different from the point of time of the reference frame. The candidate list is then generated to comprise candidate MV predictors that identify a pixel area in a first reference frame having a point in time different from a point in time of a first frame associated with the candidate MV predictor but belonging to the same camera view as the first frame. In a particular embodiment, the candidate list may also comprise candidate MV predictors that identify a pixel area in a first reference frame having a point in time different from the point in time of the first frame and belonging to a camera view different from the camera view of the first frame. In the latter case, an inter-view disparity component can optionally be removed from the candidate MV predictor as previously discussed herein.

Correspondingly, if the determined MV type is an inter-view MV type, i.e. when the current camera view is different from the camera view of the reference frame, then the candidate list is generated to comprise candidate MV predictors that identify a pixel area in a first reference frame having a point in time equal to a point in time of a first frame associated with the candidate MV predictor but belonging to a camera view different from the camera view of the first frame. In a particular embodiment, the candidate list may also comprise candidate MV predictors that identify a pixel area in a first reference frame having a point in time different from the point in time of the first frame and belonging to a camera view different from the camera view of the first frame. In the latter case, a temporal motion component can optionally be removed from the candidate MV predictor as previously discussed herein.

The generation of the candidate list may optionally involve identifying the candidate MV predictors from a set of multiple candidate MV predictors. This set is then determined as previously disclosed herein based on a position of the current pixel block in the current frame, the point in time of the current frame and the identifier or number of the current camera view.

Figure 12:
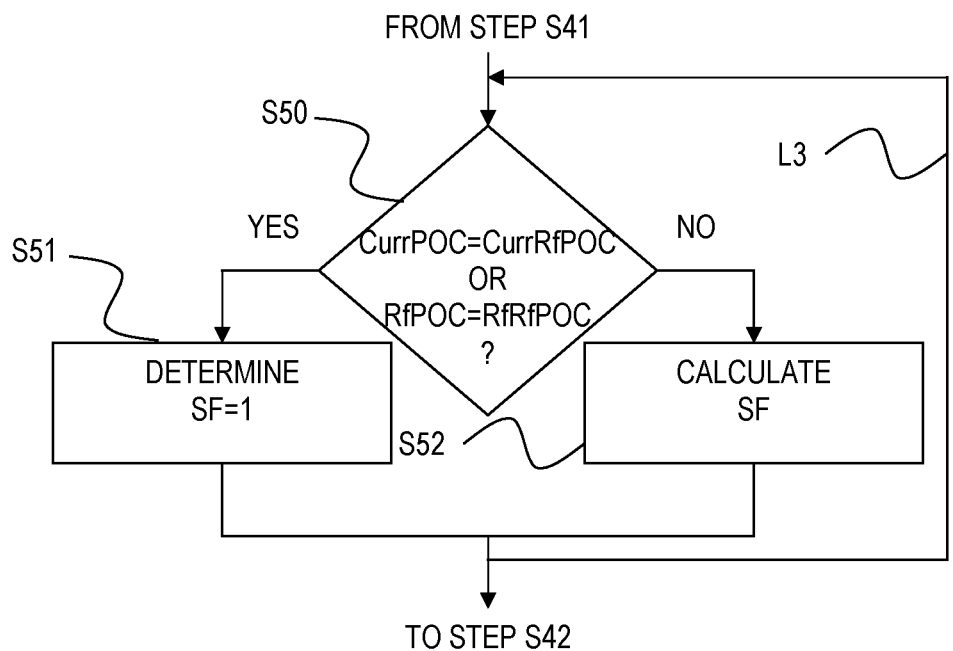
FIG. 12 is a flow diagram illustrating additional steps of the method in FIG. 11 according to an embodiment.

FIG. 12 is a flow diagram illustrating additional, optional steps of the method in FIG. 11 according to an embodiment. In this embodiment, the current frame has a current POC and the reference frame identified by the reference frame index has a reference POC. The method continues from step S31 of FIG. 11, where at least one candidate MV predictor of the determined MV type has been provided.

The next steps S50, S53 or S50, S52 are performed for each candidate MV predictor identified in step S41, which is schematically illustrated by the line L3. The next step S50 compares POCs for the current frame and the reference frame and POC for the first frame and the first reference frame. This step S50 is performed as previously disclosed herein in connection with step S10 of FIG. 5. If the current POC is equal to the reference POC and/or the POC of the first frame is equal to the POC of the first reference frame, the method continues to step S51 where a scaling factor for the current candidate MV predictor is set to be equal to a fixed predefined value, preferably one. This step S51 corresponds to step S11 in FIG. 5. However, for other candidate MV predictors, the POCs might not be equal for the current frame and the reference frame and for the first frame and the first reference frame. The method then continues to step S52 where a scaling factor is calculated for the current candidate MV predictor as previously disclosed herein in connection with step S12 of FIG. 5.

The method then continues from step S51 or S52 to step S42 in FIG. 12, where the candidate list is generated to comprise at least one, preferably multiple, scaled candidate MV predictors. Such a scaled candidate MV predictor is then obtained based on multiplying the candidate MV predictor with the scaling factor determined for the candidate MV predictor in step S51 or step S52.

If the current camera view is different from the reference camera view and the camera views of the first frame and the first reference frame are also different then a composite scaling factor is preferably calculated for a candidate MV predictor to thereby achieve a predictor scaling that is based on both reference distances and view distances. This composite scaling factor is calculated as previously disclosed herein.

Figure 13:
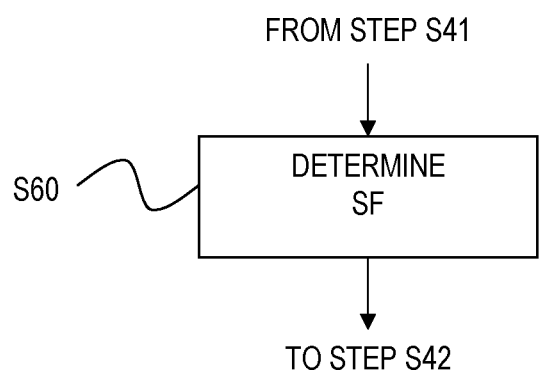
FIG. 13 is a flow diagram illustrating an additional step of the method in FIG. 11 according to another embodiment.

FIG. 13 is a flow diagram illustrating an additional, optional step of the method in FIG. 11 according to another embodiment. The method continues from step S41 of FIG. 11. A next step S60 determines a respective scaling factor for each identified candidate MV predictor. Such a scaling factor is determined based on the baseline distance between the current camera view and the reference camera view and the baseline distance between the first camera view and the first reference camera view. Step S60 is basically performed as previously disclosed herein in connection with step S20 of FIG. 6. The method then continues to step S42 of FIG. 13, which generates a candidate list of at least one scaled candidate MV predictor, which is obtained based on the candidate MV predictor and the scaling factor determined for the candidate MV predictor in step S60.

The scaling factor determined in step S60 is preferably determined based on a quotient of the baseline distances as previously disclosed herein. In a particular embodiment, the scaling factor could be determined to be a composite scaling factor to thereby not only be based on baseline distances but also be based on reference distances and/or view distances as previously discussed herein.

Figure 14:
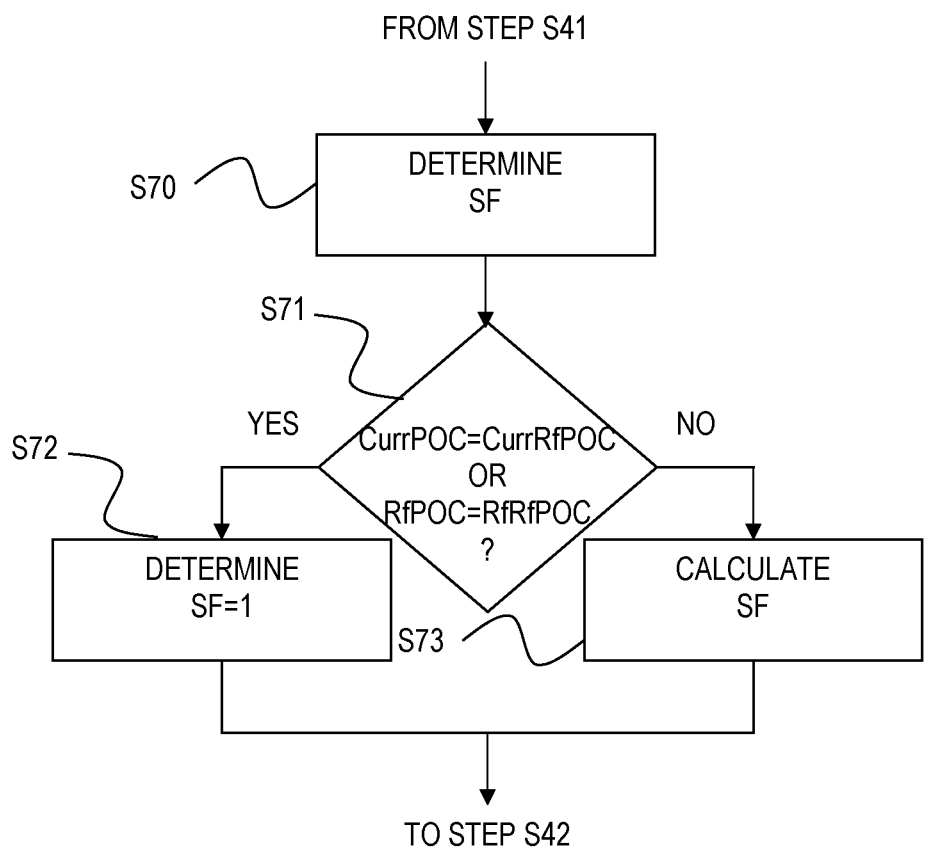
FIG. 14 is a flow diagram illustrating additional steps of the method in FIG. 11 according to a further embodiment.

FIG. 14 is a flow diagram illustrating additional steps of the method in FIG. 11 according to a further embodiment. In this embodiment, a composite scaling factor or a first scaling factor and a second scaling factor is determined for each candidate MV predictor obtained from step S41 in FIG. 11. A first step S70 determines a first scaling factor based on baseline distances. This step S70 corresponds to step 20 in FIG. 6; step S30 in FIG. 7 and step S60 in FIG. 13. The method then continues to steps S71-S73, which determines a second scaling factor to either be equal to a fixed predefined value (step S72) or calculated based on POC values (step S73). These steps S71-S73 correspond to steps S10-S12 in FIG. 5; steps S31-S33 in FIG. 7 and steps S50-S52 in FIG. 12. The method then continues to step S42 in FIG. 11 where the candidate list is generated to comprise at least one scaled candidate MV predictor formed based on the candidate MV predictor multiplied by the first scaling factor from step S70 and multiplied by the second scaling factor from step S72 or S73.

Figure 15:
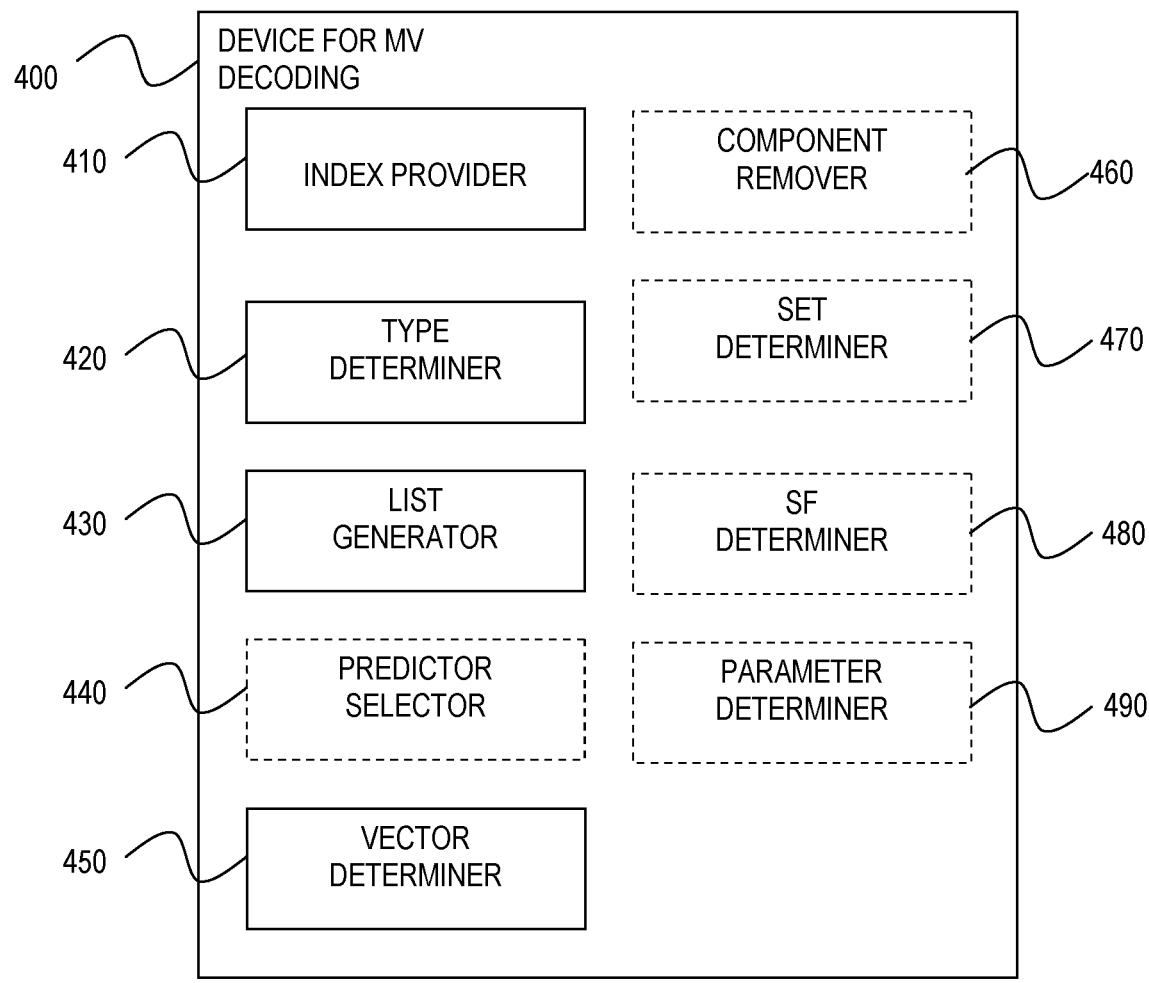
FIG. 15 is a schematic block diagram of a device for motion vector decoding according to an embodiment.

FIG. 15 is a schematic block diagram illustrating a device 400 for motion vector decoding for encoded multi-view video. The device 400 comprises an index provider 410 configured to provide a reference frame index for a current pixel block to be decoded in a current frame of a current camera view. The index provider 410 typically retrieves this reference frame index from the bitstream and in particular from the encoded representation of the pixel block or of the current frame. This reference frame index is employed in order to identify a reference frame. The reference frame typically comprises a pixel area that is to be used as a predictor for the pixel values of the current pixel block. A type determiner 420 is implemented in the device 400 and is configured to determine a MV type from multiple predefined MV types for the current pixel block based on i) the current camera view and the camera view of the reference frame and/or based on ii) a point in time of the current frame and a point in time of the reference frame. This type determiner 420 then basically operates similar to the type determiner 120 of FIG. 8. A list generator 430 is configured to generate a candidate list comprising at least one, but preferably multiple, candidate MV predictors identified for the current pixel block and being of the MV type determined by the type determiner 420. A vector determiner 450 is configured to determine a motion vector for the current pixel block based on a candidate MV predictor of the list generated by the list generator 430.

In a particular embodiment, the device 400 also comprises a predictor selector 440 that is configured to select a MV predictor for the current pixel block from the candidate list generated by the list generator 430. The predictor selector 440 advantageously retrieves and decodes a predictor index from the bitstream, such as from the encoded representation of the current pixel block. This predictor index is then used in order to select the MV predictor from the candidate list. In such a case, the vector determiner 450 preferably determines the motion vector for the current pixel block based on the MV predictor selected by the predictor selector 440 and a residual motion vector associated with the current pixel block and preferably retrieved from the encoded bitstream, such as from the encoded representation of the current pixel block as previously disclosed herein.

The type determiner 420 could determine the MV type to be a temporal MV type or an inter-view MV type as previously disclosed herein. An optional component remover 460 and/or an optional set determiner 470 can be provided in the device 400 and then operate as previously discussed herein in connection with the component remover 150 and the set determiner 160 of FIG. 8.

As previously discussed herein, the list generator 430 could be configured to identify the at least one candidate MV predictor from a set of multiple candidate MV predictors, where this set is then determined by the optional set determiner 470.

In an embodiment, the device 400 comprises a SF determiner 470 configured to determine a respective scaling factor for each candidate MV predictor provided by the type determiner 420. The operation of this SF determiner 470 is basically as previously discussed herein in connection with the SF determiner 180 of FIG. 8. The list generator 430 is then configured to generate the candidate list comprising a scaled candidate MV predictor for each candidate MV predictor provided by the type determiner 420. Such a scaled candidate MV predictor is obtained based on the candidate MV predictor multiplied by the scaling factor determined by the SF determiner 480 for the candidate MV predictor.

The SF determiner 180 optionally determines a composite scaling factor for those pixel blocks where the current camera view is different from the reference camera view and a camera view of the first frame is different from a camera view of the first reference frame. Such a composite scaling factor is then also based on view distances and not only reference distances as previously discussed herein. The list generator 430 then obtains a scaled candidate MV predictor by multiplying a candidate MV predictor with its determined composite scaling factor.

An optional parameter determiner 490 can be implemented in the device 400 and then operates as previously disclosed herein in connection with the parameter determiner 195 of FIG. 8.

In an alternative embodiment, the SF determiner 480 of the device 400 operates as previously disclosed herein with regard to determining scaling factors based on baseline distance. Thus, the SF determiner 480 determines scaling factors for the candidate MV predictors identified by the type determiner 420 and where these scaling factors are based on baseline distances of the camera views. The list generator 430 then generates the candidate list comprising at least one scaled candidate MV predictor formed based on the at least one candidate MV predictor multiplied by its respective scaling factor.

The SF determiner 480 preferably determines the scaling factor as a quotient between the baseline distance of the current view and the reference view and the baseline distance of the first frame and the first reference frame. Furthermore, the SF determiner 480 could also determine the scaling factor based on reference distances and/or view distances as previously disclosed herein.

In an embodiment, as mentioned above, the scaling factor 480 is configured to determine, for each candidate MV predictor, a first scaling factor based on baseline distances and a second scaling factor to be equal to a fixed predefined value or based on POC values. In addition to these two scaling factors an additional scaling factor determined based on view differences as previously disclosed herein could be determined for each candidate MV predictor by the SF determiner 480.

The device 400 can be implemented in hardware, in software or a combination of hardware and software. The device 400 can be implemented in a user equipment, such as a mobile telephone, tablet, desktop, notebook, multimedia player, video streaming server, set-top box or computer. The device 400 may also be implemented in a network device in the form of or connected to a network node, such as radio base station, in a communication network or system. The device 400 is advantageously implemented as a part of a decoder for decoding encoded multi-view video content.

Although the respective unit 410-490 disclosed in conjunction with FIG. 15 have been disclosed as physically separate units 410-490 in the device 400, and all may be special purpose circuits, such as ASICs (Application Specific Integrated Circuits), alternative embodiments of the device 400 are possible where some or all of the units 410-490 are implemented as computer program modules running on a general purpose processor. Such an embodiment is disclosed in FIG. 16.

Figure 16:
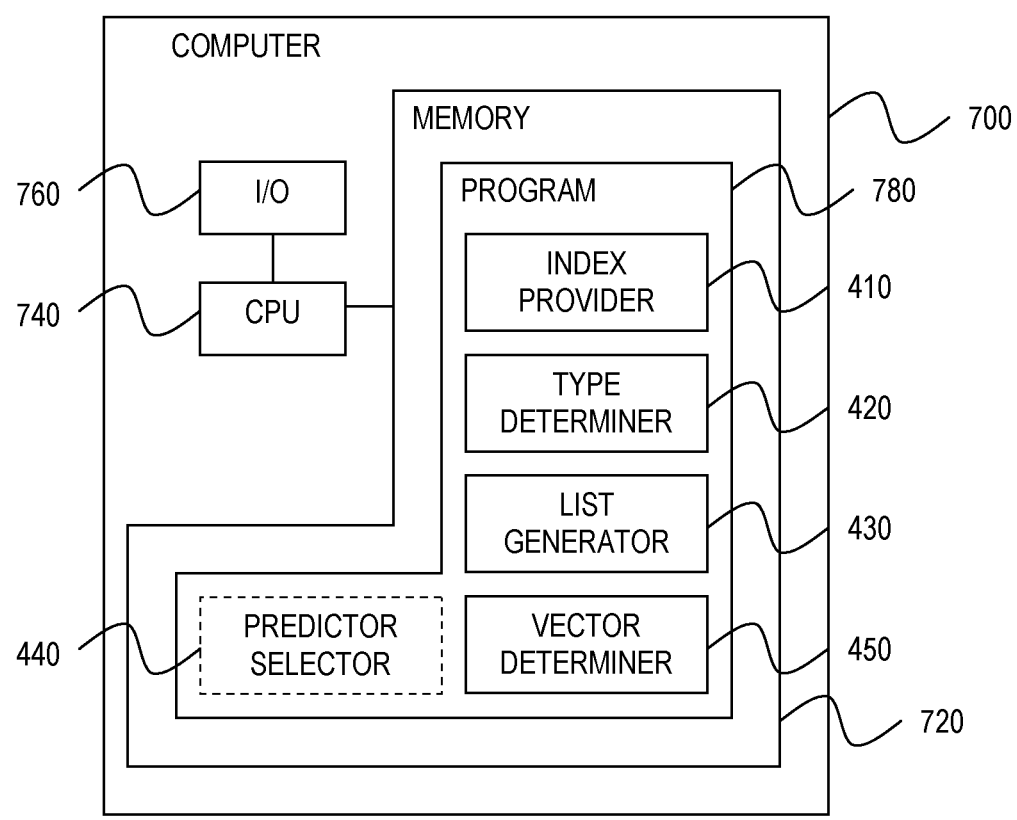
FIG. 16 is a schematic block diagram illustrating a computer comprising a computer program product with a computer program for motion vector decoding according to an embodiment.

FIG. 16 schematically illustrates an embodiment of a computer 700 having a processing unit 740, such as a DSP (Digital Signal Processor) or CPU (Central Processing Unit). The processing unit 740 can be a single unit or a plurality of units for performing different steps of the method described herein. The computer 700 also comprises an input/output (I/O) unit 760 for receiving an encoded bitstream of encoded pixel block representations and outputs determined motion vectors, or decoded pixel values. The I/O unit 760 has been illustrated as a single unit in FIG. 16 but can likewise be in the form of a separate input unit and a separate output unit.

Furthermore, the computer 700 comprises at least one computer program product in the form of a non-volatile memory 720, for instance an EEPROM (Electrically Erasable Programmable Read-Only Memory), a flash memory or a disk drive. The computer program product comprises a computer program 780, which comprises code means which when run on or executed on or by the computer 700, such as by the processing unit 740, causes the computer 700 to perform the steps of the method described in the foregoing in connection with FIG. 11. Hence, in an embodiment the code means in the computer program 780 comprises an index providing module or index provider 410 for providing a reference frame index, a type determining module or type determiner 420 for determining a MV type, a list generating module or list generator 430 for generating a candidate list, an optional predictor selecting module or predictor selector 440 for selecting a MV predictor and a vector determining module or vector determiner 450 for determining a motion vector. These modules 410-450 essentially perform the steps of the flow diagram in FIG. 11 when run on the processing unit 740. Thus, when the different modules 410-450 are run on the processing unit 740 they correspond to the corresponding units 410-450 of FIG. 15.

The computer program 780 may additionally comprise a component removing module or component remover, a set determining module or set determiner, a SF determining module or SF determiner and/or a parameter determining module or parameter determiner as disclosed in connection with FIG. 15.

Figure 17:
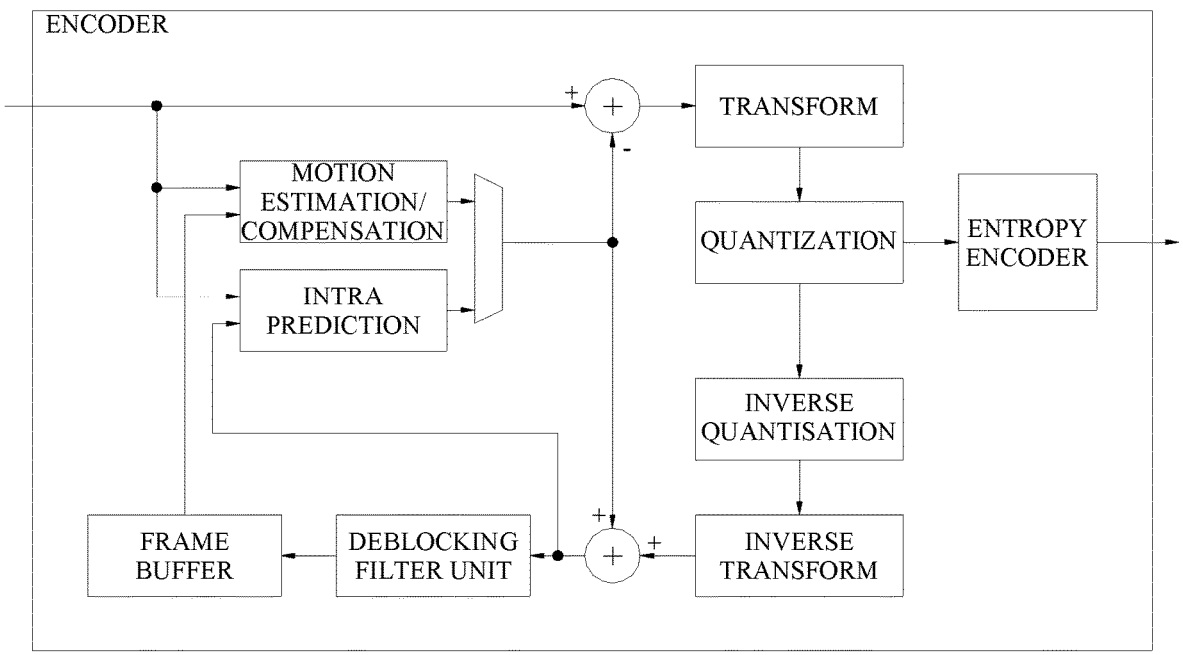
FIG. 17 is a schematic block diagram illustrating an encoder according to an embodiment.

FIG. 17 is a schematic block diagram of an encoder for encoding a pixel blocks for multi-view video according to an embodiment.

A current pixel block is predicted by performing a motion prediction or estimation by a motion estimator or predictor from an already provided pixel blocks in the same frame or in a previous frame of the current camera view or of another camera view. The result of the motion prediction is a motion vector identifying a pixel area in a reference frame in the case of inter prediction. The motion vector is utilized by a motion compensator for outputting an inter prediction of the pixel block.

An intra predictor computes an intra prediction of the current pixel block. The outputs from the motion estimator/compensator and the intra predictor are input in a selector that either selects intra prediction or inter prediction for the current block of pixels. The output from the selector is input to an error calculator in the form of an adder that also receives the pixel values of the current pixel block. The adder calculates and outputs a residual error as the difference in pixel values between the current pixel block of pixels and its predictor.

The error is transformed in a transformer, such as by a discrete cosine transform, and quantized by a quantizer followed by coding in an encoder, such as by entropy encoder. In inter coding, also the estimated motion vector is brought to the encoder for generating the coded representation of the current pixel block. This (entropy) encoder then comprises at least a portion of the units of device for MV prediction according to FIG. 8 or can operate with a program as disclosed in FIG. 9. The MV predictor of the device for MV prediction can be implemented as the motion estimator/compensator.

The transformed and quantized residual error for the current pixel block is also provided to an inverse quantizer and inverse transformer to retrieve the original residual error. This error is added by an adder to the pixel block predictor output from the motion compensator or the intra predictor to create a reference pixel block that can be used in the prediction and coding of a next pixel block. This new reference pixel block is optionally first processed by a filtering control device to determine whether de-blocking filtering will be applied and in such a case what type of de-blocking filter to use. The processed new reference pixel block is then temporarily stored in a frame buffer, where it is available to the intra predictor and the motion estimator/compensator.

Figure 18:
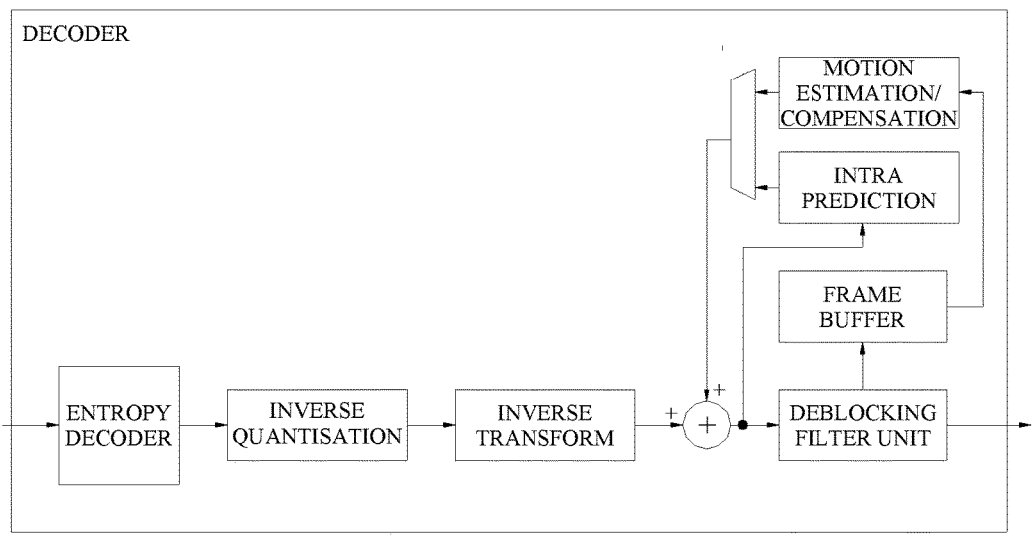
FIG. 18 is a schematic block diagram illustrating a decoder according to an embodiment.

FIG. 18 is a corresponding schematic block diagram of a decoder according to an embodiment. The decoder comprises a decoder, such as entropy decoder, for decoding an encoded representation of a pixel block to get a set of quantized and transformed residual errors. The decoder preferably comprises a device for motion vector decoding according to FIG. 15 or can operate with a program as disclosed in FIG. 16. These residual errors are dequantized in an inverse quantizer and inverse transformed by an inverse transformer to get a set of residual errors.

These residual errors are added in an adder to the pixel values of a reference pixel block or pixel area. The reference block is determined by a motion estimator/compensator (or motion predictor/compensator) or intra predictor, depending on whether inter or intra prediction is performed. A selector is thereby interconnected to the adder and the motion estimator/compensator and the intra predictor. The resulting decoded pixel block output form the adder is input to an optional filtering control device in order to de-blocking filter any blocking artifacts. The filtered pixel block is output form the decoder and is furthermore preferably temporarily provided to a frame buffer and can be used as a reference block of pixels for a subsequent block of pixels to be decoded. The frame buffer is thereby connected to the motion estimator/compensator to make the stored blocks of pixels available to the motion estimator/compensator.

The output from the adder is preferably also input to the intra predictor to be used as an unfiltered reference pixel block.

Figure 19:
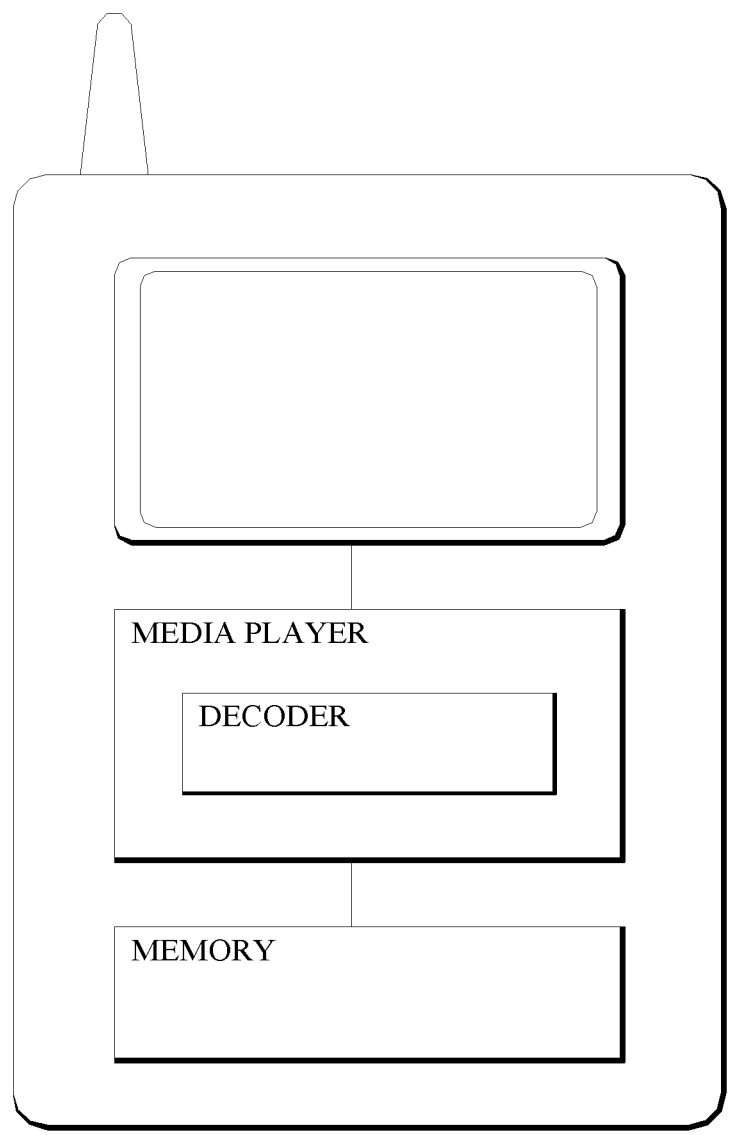
FIG. 19 is a schematic block diagram of a media terminal exemplified by a user equipment according to an embodiment.

FIG. 19 is a schematic block diagram of a media terminal housing a decoder with a device for motion vector decoding. The media terminal can be any device having media decoding functions that operates on an encoded video stream of encoded multi-view video frames to thereby decode the video frames and make the video data available. Non-limiting examples of such devices include mobile telephones and other portable media players, computers, decoders, game consoles, etc. The media terminal comprises a memory configured to store encoded video frames. These encoded video frames can have been generated by the media terminal itself. In such a case, the media terminal preferably comprises a media engine or recorder together with a connected encoder, such as the encoder of FIG. 17. Alternatively, the encoded video frames are generated by some other device and wirelessly transmitted or transmitted by wire to the media terminal. The media terminal then comprises a transceiver (transmitter and receiver) or input and output port to achieve the data transfer.

The encoded video frames are brought from the memory to a decoder, such as the decoder illustrated in FIG. 18. The decoder then decodes the encoded video frames into decoded video frames. The decoded video frames are provided to a media player that is configured to render the decoded video frames into video data that is displayable on a display or screen of or connected to the media terminal.

In FIG. 19, the media terminal has been illustrated as comprising both the decoder and the media player, with the decoder implemented as a part of the media player. This should, however, merely be seen as an illustrative but non-limiting example of an implementation embodiment for the media terminal. Also distributed implementations are possible where the decoder and the media player are provided in two physically separated devices are possible and within the scope of media terminal as used herein. The display could also be provided as a separate device connected to the media terminal, where the actual data processing is taking place.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible.

REFERENCES

[1] Jung and Laroche, Competition-Based Scheme for Motion Vector Selection and Coding, ITU—Telecommunications Standardization Sector, Study Group 16 Question 16, VCEG-AC06, 17-18 Jul. 2006

The invention claimed is:

1. A method of motion vector prediction for multi-view video coding of video content from multiple camera views, said method comprising:
   determining a motion vector type for a motion vector, from multiple predefined motion vector types, wherein said motion vector is estimated for a current pixel block in a current frame of a current camera view of said multiple camera views and said motion vector identifies a reference pixel area in a reference frame, wherein said motion vector type is determined based on at least one of i) said current camera view and a camera view of said reference frame among said multiple camera views, and ii) a point in time of said current frame and a point in time of said reference frame;
   identifying at least one candidate motion vector predictor of said determined motion vector type; and
   determining a motion vector predictor for said motion vector from only among said at least one candidate motion vector predictor of said determined motion vector type.

2. The method of claim 1, wherein
   determining said motion vector type comprises determining said motion vector type to be a temporal motion vector type in the event that said point of time of said current frame is different from said point of time of said reference frame; and
   identifying said at least one candidate motion vector predictor comprises identifying at least one candidate motion vector predictor associated with a pixel block in a first frame and identifying a pixel area in a first reference frame having a point in time different from a point in time of said first frame but belonging to a same camera view of said multiple camera views as said first frame.

3. The method of claim 1, wherein
   determining said motion vector type comprises determining said motion vector type to be an inter-view motion vector type in the event that said current camera view is different from said camera view of said reference frame; and
   identifying said at least one candidate motion vector predictor comprises identifying at least one candidate motion vector predictor associated with a pixel block in a first frame in a first camera view of said multiple camera views and identifying a pixel area in a first reference frame having a point in time equal to a point in time of said first frame but belonging to a camera view of said multiple camera views different from said first camera view.

4. The method of claim 1, wherein identifying said at least one candidate motion vector predictor comprises identifying said at least one candidate motion vector predictor from a set of multiple candidate motion vector predictors determined based on a position of said current pixel block in said current frame, said point in time of said current frame and said current camera view.

5. The method of claim 1, further comprising calculating a residual motion vector based on said motion vector and said motion vector predictor.

6. The method of claim 1, further comprising estimating, for said current pixel block, said motion vector identifying said reference pixel area in said reference frame.

7. The method of claim 6, wherein estimating said motion vector comprises estimating, for said current pixel block, said motion vector identifying said reference pixel area in said reference frame of a reference camera view of said multiple camera views, said current frame having a current picture order count (CurrPOC) and said reference frame having a reference picture order count (CurrRfPOC), wherein said at least one candidate motion vector predictor is associated with a pixel block in a first frame having a first picture order count (RfPOC) and identifies a pixel area in a first reference frame having a first reference picture order count (RfRfPOC), said method further comprising:
   determining, for said at least one candidate motion vector predictor, a scaling factor to be equal to a fixed predefined value in the event that i) said current picture order count is equal to said reference picture order count or ii) said first picture order count is equal to said first reference picture order count, and otherwise determining said scaling factor to be based on $$\frac{CurrPOC - CurrRfPOC}{RfPOC - RfRfPOC};$$

and determining, for said at least one candidate motion vector predictor, a scaled candidate motion vector predictor based on said candidate motion vector predictor multiplied by said scaling factor, wherein determining said motion vector predictor comprises determining said motion vector predictor for said motion vector based on said at least one scaled candidate motion vector predictor.

8. The method of claim 6, wherein estimating said motion vector comprises estimating, for said current pixel block, said motion vector identifying said reference pixel area in said reference frame of a reference camera view of said multiple camera views, said current camera view being different from said reference camera view, wherein said at least one candidate motion vector predictor is associated with a pixel block in a first frame of a first camera view of said multiple camera views and identifies a pixel area in a first reference frame of a first reference camera view of said multiple camera views, said first camera view being different from said first reference camera view, and wherein said method further comprises:

determining a scaling factor, for said at least one candidate motion vector predictor, based on a baseline distance between said current camera view and said reference camera view and a baseline distance between said first camera view and said first reference camera view; and determining, for said at least one candidate motion vector predictor, a scaled candidate motion vector predictor based on said candidate motion vector predictor multiplied by said scaling factor, wherein determining said motion vector predictor comprises determining said motion vector predictor for said motion vector based on said at least one scaled candidate motion vector predictor.

9. The method of claim 8, wherein determining said scaling factor comprises determining said scaling factor, for said at least one candidate motion vector predictor, based on a quotient between said baseline distance between said current camera view and said reference camera view and said baseline distance between said first camera view and said first reference camera view.

10. A non-transitory computer-readable medium comprising, stored thereupon, a computer program for predicting motion vectors for multi-view video coding of video content from multiple camera views, said computer program comprising code that, when run on a computer, causes said computer to:

determine a motion vector type for a motion vector, from multiple predefined motion vector types, wherein said motion vector is estimated for a current pixel block in a current frame of a current view of said multiple camera views and said motion vector identifies a reference pixel area in a reference frame, wherein said motion vector type is determined based on at least one of i) said current camera view and a camera view of said reference frame among said multiple camera views, and ii) a point in time of said current frame and a point in time of said reference frame;

identify at least one candidate motion vector predictor of said determined motion vector type; and determine a motion vector predictor for said motion vector from only among said at least one candidate motion vector predictor of said determined motion vector type.

11. A device for motion vector prediction for multi-view video coding of video content from multiple camera views, said device comprising:

a type determiner configured to determine a motion vector type for a motion vector, from multiple predefined motion vector types, wherein said motion vector is estimated for a current pixel block in a current frame of a current camera view of said multiple camera views and said motion vector identifies a reference pixel area in a reference frame, wherein said type determiner is configured to determine said motion vector type based on at least one of i) said current camera view and a camera view of said reference frame among said multiple camera views, and ii) a point in time of said current frame and a point in time of said reference frame;

a predictor identifier configured to identify at least one candidate motion vector predictor of said motion vector type determined by said type determiner; and a predictor determiner configured to determine a motion vector predictor for said motion vector from only among said at least one candidate motion vector predictor of said determined motion vector type identified by said predictor identifier.

12. The device of claim 11, wherein:

said type determiner is configured to determine said motion vector type to be a temporal motion vector type in the event that said point of time of said current frame is different from said point of time of said reference frame; and said predictor identifier is configured to identify at least one candidate motion vector predictor associated with a pixel block in a first frame and identifying a pixel area in a first reference frame having a point in time different from a point in time of said first frame but belonging to a same camera view of said multiple camera views as said first frame.

13. The device of claim 11, wherein:

said type determiner is configured to determine said motion vector type to be an inter-view motion vector type in the event that said current camera view is different from said camera view of said reference frame; and said predictor identifier is configured to identify at least one candidate motion vector predictor associated with a pixel block in a first frame in a first camera view of said multiple camera views and identify a pixel area in a first reference frame having a point in time equal to a point in time of said first frame but belonging to a camera view of said multiple camera views different from said first camera view.

14. The device of claim 11, wherein said predictor identifier is configured to identify said at least one candidate motion vector predictor from a set of multiple candidate motion vector predictors determined based on a position of said current pixel block in said current frame, said point in time of said current frame and said current camera view.

15. The device of claim 11, further comprising a vector calculator configured to calculate a residual motion vector based on said motion vector and said motion vector predictor.

16. The device of claim 11, further comprising a motion vector (MV) estimator configured to estimate, for said current pixel block, said motion vector identifying said reference pixel area in said reference frame.

17. The device of claim 16, wherein said MV estimator is configured to estimate, for said current pixel block, said motion vector identifying said reference pixel area in said reference frame of a reference camera view of said multiple camera views, said current frame having a current picture order count (CurrPOC) and said reference frame having a reference picture order count (CurrRfPOC), wherein said at least one candidate motion vector predictor is associated with a pixel block in a first frame having a first picture order count (RfPOC) and identifies a pixel area in a first reference frame having a first reference picture order count (RfRfPOC), and wherein said device further comprises:
a scaling factor determiner configured to determine, for said at least one candidate motion vector predictor, a scaling factor to be equal to a fixed predefined value in the event that i) said current picture order count is equal to said reference picture order count, or ii) said first picture order count is equal to said first reference picture order count, and otherwise determine said scaling factor to be based on $$\frac{CurrPOC - CurrRfPOC}{RfPOC - RfRfPOC};$$

and
a scaled predictor determiner configured to determine, for said at least one candidate motion vector predictor, a scaled candidate motion vector predictor based on said candidate motion vector predictor multiplied by said scaling factor, wherein said predictor determiner is configured to determine said motion vector predictor for said motion vector based on said at least one scaled candidate motion vector predictor.

18. The device of claim 16, wherein said MV estimator is configured to estimate, for said current pixel block, said motion vector identifying said reference pixel area in said reference frame of a reference camera view of said multiple camera views, said current camera view being different from said reference camera view, said at least one candidate motion vector predictor is associated with a pixel block in a first frame of a first camera view of said multiple camera views and identifies a pixel area in a first reference frame of a first reference camera view of said multiple camera views, said first camera view being different from said first reference camera view, wherein said device further comprises:
a scaling factor determiner configured to determine a scaling factor for said at least one candidate motion vector predictor based on a baseline distance between said current camera view and said reference camera view and a baseline distance between said first camera view and said first reference camera view; and
a scaled predictor determiner configured to determine, for said at least one candidate motion vector predictor, a scaled candidate motion vector predictor based on said candidate motion vector predictor multiplied by said scaling factor, wherein said predictor determiner is configured to determine said motion vector predictor for said motion vector based on said at least one scaled candidate motion vector predictor.

19. The device of claim 18, wherein said scaling factor determiner is configured to determine said scaling factor, for said at least one candidate motion vector predictor, based on a quotient between said baseline distance between said current camera view and said reference camera view and said baseline distance between said first camera view and said first reference camera view.

20. A method of motion vector decoding for encoded multi-view video from multiple camera views, said method comprises:
providing, for a current pixel block in a current frame of a current camera view of said multiple camera views, a reference frame index identifying a reference frame;
determining a motion vector type for said current pixel block, from multiple predefined motion vector types and based on at least one of i) said current camera view and a camera view of said reference frame among said multiple camera views, and ii) a point in time of said current frame and a point in time of said reference frame;
generating a candidate list comprising at least one candidate motion vector predictor of said determined motion vector type, wherein said candidate list comprises only candidate motion vector predictors of said determined motion vector type; and
determining a motion vector for said current pixel block based on a candidate motion vector predictor of said candidate list.

21. The method of claim 20, wherein:
determining said motion vector type comprises determining said motion vector type to be a temporal motion vector type if said point of time of said current frame is different from said point of time of said reference frame; and
generating said candidate list comprises generating said candidate list comprising at least one candidate motion vector predictor associated with a pixel block in a first frame and identifying a pixel area in a first reference frame having a point in time different from a point in time of said first frame but belonging to a same camera view of said multiple camera views as said first frame.

22. The method of claim 20, wherein:
determining said motion vector type comprises determining said motion vector type to be an inter-view motion vector type in the event that said current camera view is different from said camera view of said reference frame; and
generating said candidate list comprises generating said candidate list comprising at least one candidate motion vector predictor associated with a pixel block in a first frame in a first camera view of said multiple camera views and identifying a pixel area in a first reference frame having a point in time equal to a point in time of said first frame but belonging to a camera view of said multiple camera views different from said first camera view.

23. The method of claim 20, wherein generating said candidate list comprises identifying said at least one candidate motion vector predictor from a set of multiple candidate motion vector predictors determined based on a position of said current pixel block in said current frame, said point in time of said current frame and said current camera view.

24. The method of claim 23, further comprising determining said set of multiple candidate motion vector predictors based on at least one of i) motion vectors associated with spatially neighboring pixel blocks in said current frame, ii) motion vectors associated with temporally neighboring pixel blocks in frames different from said current frame but belonging to said current camera view, iii) motion vectors associated with pixel blocks in frames belonging to camera views of said multiple camera views different from said current camera view but having a respective point in time equal to said point in time of said current frame.

25. The method of claim 20, wherein providing said reference frame index comprises providing, for said current pixel block in said current frame having a current picture order count (CurrPOC) and being present in said current camera view, said reference frame index identifying said reference frame having a reference picture order count (CurrRfPOC) and being present in a reference camera view of said multiple camera views, said at least one candidate motion vector predictor is associated with a pixel block in a first frame having a first picture order count (RfPOC) and identifies a pixel area in a first reference frame having a first reference picture order count (RfRfPOC), said method further comprises:

determining, for said at least one candidate motion vector predictor, a respective scaling factor to be equal to a fixed predefined value if i) said current picture order count is equal to said reference picture order count, or ii) said first picture order count is equal to said first reference picture order count and otherwise determining said scaling factor to be base on $$\frac{CurrPOC - CurrRfPOC}{RfPOC - RfRfPOC},$$

wherein generating said candidate list comprises generating said candidate list comprising at least one scaled candidate motion vector predictor formed based on said at least one candidate motion vector predictor multiplied by said respective scaling factor.

26. The method of claim 20, wherein providing said reference frame index comprises providing, for said current pixel block, said reference frame index identifying said reference frame of a reference camera view of said multiple camera views, said current camera view being different from said reference camera view, wherein said at least one candidate motion vector predictor is associated with a pixel block in a first frame of a first camera view of said multiple camera views and identifies a pixel area in a first reference frame of a first reference camera view of said multiple camera views, said first camera view being different from said first reference camera view, said method further comprising:

determining, for said at least one candidate motion vector predictor, a respective scaling factor based on a baseline distance between said current camera view and said reference camera view and a baseline distance between said first camera view and said first reference camera view, wherein generating said candidate list comprises generating said candidate list comprising at least one scaled candidate motion vector predictor formed based on said at least one candidate motion vector predictor multiplied by said respective scaling factor.

27. The method of claim 26, wherein determining said respective scaling factor comprises determining said respective scaling factor, for said at least one candidate motion vector predictor, based on a quotient between said baseline distance between said current camera view and said reference camera view and said baseline distance between said first camera view and said first reference camera view.

28. The method of claim 20, further comprising selecting a motion vector predictor from said candidate list for said current pixel block based on a predictor index associated with said current pixel block, wherein determining said motion vector comprises determining said motion vector for said current pixel block based on said selected motion vector predictor and a residual motion vector associated with said current pixel block.

29. A non-transitory computer-readable medium comprising, stored thereupon, a computer program for decoding motion vectors for encoded multi-view video from multiple camera views, said computer program comprising code that, when run on a computer, causes said computer to:

provide, for a current pixel block in a current frame of a current camera view of said multiple camera views, a reference frame index identifying a reference frame;

determine a motion vector type for said current pixel block, from multiple predefined motion vector types and based on at least one of i) said current camera view and a camera view of said reference frame among said multiple camera views, and ii) a point in time of said current frame and a point in time of said reference frame;

generate a candidate list comprising at least one candidate motion vector predictor of said determined motion vector type, wherein said candidate list comprises only candidate motion vector predictors of said determined motion vector type; and determine a motion vector for said current pixel block based on a candidate motion vector predictor of said candidate list.

30. A device for motion vector decoding for encoded multi-view video from multiple camera views, said device comprising:

an index provider configured to provide, for a current pixel block in a current frame of a current camera view of said multiple camera views, a reference frame index identifying a reference frame;

a type determiner configured to determine a motion vector type for said current pixel block, from multiple predefined motion vector types and based on at least one of i) said current camera view and a camera view of said reference frame among said multiple camera views, and ii) a point in time of said current frame and a point in time of said reference frame;

a list generator configured to generate a candidate list comprising at least one candidate motion vector predictor of said motion vector type determined by said type determiner, wherein said candidate list comprises only candidate motion vector predictors of said determined motion vector type; and a vector determiner configured to determine a motion vector for said current pixel block based on a candidate motion vector predictor of said candidate list.

31. The device of claim 30, wherein said type determiner is configured to determine said motion vector type to be a temporal motion vector type in the event that said point of time of said current frame is different from said point of time of said reference frame; and said list generator is configured to generate said candidate list comprising at least one candidate motion vector predictor associated with a pixel block in a first frame and i) identifying a pixel area in a first reference frame having a point in time different from a point in time of said first frame but belonging to a same camera view of said multiple camera views as said first frame, or ii) identifying a pixel area in a first reference frame having a point in time different from said point in time of said first frame and belonging to a camera view of said multiple camera views different from said camera view of said first frame.

32. The device of claim 30, wherein
said type determiner is configured to determine said motion vector type to be an inter-view motion vector type in the event that said current camera view is different from said camera view of said reference frame; and
said list generator is configured to generate said candidate list comprising at least one candidate motion vector predictor associated with a pixel block in a first frame in a first camera view of said multiple camera views and identifying a pixel area in a first reference frame having a point in time equal to a point in time of said first frame but belonging to a camera view of said multiple camera views different from said first camera view.

33. The device of claim 30, wherein said list generator is configured to identify said at least one candidate motion vector predictor from a set of multiple candidate motion vector predictors determined based on a position of said current pixel block in said current frame, said point in time of said current frame and said current camera view.

34. The device of claim 30, wherein said index provider is configured to provide, for said current pixel block in said current frame having a current picture order count (CurrPOC), said reference frame index identifying said reference frame having a reference picture order count (CurrRfPOC) and being present in a reference camera view of said multiple camera views, said at least one candidate motion vector predictor is associated with a pixel block in a first frame having a first picture order count (RfPOC) and identifies a pixel area in a first reference frame having a first reference picture order count (RfRfPOC), said device further comprises:
a scaling factor determiner configured to determine, for said at least one candidate motion vector predictor, a respective scaling factor to be equal to a fixed predefined value in the event that i) said current picture order count is equal to said reference picture order count, or ii) said first picture order count is equal to said first reference picture order count, and to otherwise determine said scaling factor to be based on $$\frac{CurrPOC - CurrRfPOC}{RfPOC - RfRfPOC},$$

wherein said list generator is configured to generate said candidate list comprising at least one scaled candidate motion vector predictor formed based on said at least one candidate motion vector predictor multiplied by said respective scaling factor.

35. The device of claim 30, wherein said index provider is configured to provide, for said current pixel block, said reference frame index identifying said reference frame of a reference camera view of said multiple camera views, said current camera view being different from said reference camera view, wherein said at least one candidate motion vector predictor is associated with a pixel block in a first frame of a first camera view of said multiple camera views and identifies a pixel area in a first reference frame of a first reference camera view of said multiple camera views, said first camera view being different from said first reference camera view, said device further comprising:
a scaling factor determiner configured to determine, for said at least one candidate motion vector predictor, a respective scaling factor based on a baseline distance between said current camera view and said reference camera view and a baseline distance between said first camera view and said first reference camera view, wherein said list generator is configured to generate said candidate list comprising at least one scaled candidate motion vector predictor formed based on said at least one candidate motion vector predictor multiplied by said respective scaling factor.

36. The device of claim 35, wherein said scaling factor determiner is configured to determine said respective scaling factor, for said at least one candidate motion vector predictor, based on a quotient between said baseline distance between said current camera view and said reference camera view and said baseline distance between said first camera view and said first reference camera view.

37. The device of claim 30, further comprising a predictor selector configured to select a motion vector predictor from said candidate list for said current pixel block based on a predictor index associated with said current pixel block, wherein said vector determiner is configured to determine said motion vector for said current pixel block based on said motion vector predictor selected by said predictor selector and a residual motion vector associated with said current pixel block.

* * * * *